(12) United States Patent
Kim et al.

(10) Patent No.: US 12,127,029 B2
(45) Date of Patent: *Oct. 22, 2024

(54) METHOD FOR REPORTING MEASUREMENT DATA, AND TERMINAL THEREFOR

(71) Applicant: LG ELECTRONICS INC., Seoul (KR)

(72) Inventors: Dongkyu Kim, Seoul (KR); Seungmin Lee, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 351 days.

This patent is subject to a terminal disclaimer.

(21) Appl. No.: 17/510,208

(22) Filed: Oct. 25, 2021

(65) Prior Publication Data

US 2022/0046459 A1 Feb. 10, 2022

Related U.S. Application Data

(63) Continuation of application No. 16/476,745, filed as application No. PCT/KR2017/014701 on Dec. 14, 2017, now Pat. No. 11,202,218.

(Continued)

(51) Int. Cl.
*H04W 24/10* (2009.01)
*H04B 17/345* (2015.01)
(Continued)

(52) U.S. Cl.
CPC .......... *H04W 24/10* (2013.01); *H04B 17/345* (2015.01); *H04L 1/0026* (2013.01); *H04L 5/005* (2013.01); *H04W 72/23* (2023.01)

(58) Field of Classification Search
CPC .... H04W 24/10; H04W 72/23; H04B 17/345; H04L 1/0026; H04L 5/005
See application file for complete search history.

(56) References Cited

U.S. PATENT DOCUMENTS

2013/0170387 A1 7/2013 Wang et al.
2014/0073336 A1* 3/2014 Kang ................ H04L 5/0035
(Continued)

FOREIGN PATENT DOCUMENTS

CN 101394382 3/2009
CN 102754457 10/2012
(Continued)

OTHER PUBLICATIONS

Cewit, "Forward compatible reference signal design requirement for interference mitigation," 3GPP TSG-RAN WG1 #86bis, R1-1610306, Oct. 2016, 3 pages.

(Continued)

*Primary Examiner* — Ronald B Abelson
(74) *Attorney, Agent, or Firm* — LEE, HONG, DEGERMAN, KANG & WAIMEY

(57) ABSTRACT

A method for a terminal for reporting measurement data may comprise the steps of: receiving, from a base station, interference measurement resource (IMR) configuration data or sounding reference symbol (SRS) configuration data for measuring terminal-to-terminal (UE-to-UE) cross-link interference; measuring UE-to-UE cross-link interference on the basis of IMR or SRS configuration data; and transmitting a report containing the measured UE-to-UE cross-link interference measurement value to the base station.

20 Claims, 29 Drawing Sheets

Related U.S. Application Data

(60) Provisional application No. 62/543,980, filed on Aug. 11, 2017, provisional application No. 62/443,813, filed on Jan. 9, 2017.

(51) Int. Cl.
    *H04L 1/00*        (2006.01)
    *H04L 5/00*        (2006.01)
    *H04W 72/23*     (2023.01)

(56) References Cited

U.S. PATENT DOCUMENTS

| | | |
|---|---|---|
| 2014/0321313 A1 | 10/2014 | Seo et al. |
| 2014/0328299 A1 | 11/2014 | Kalhan |
| 2015/0319636 A1 | 11/2015 | Lee et al. |
| 2016/0013984 A1 | 1/2016 | Sun et al. |
| 2016/0242188 A1* | 8/2016 | Tirola .................. H04L 5/14 |
| 2016/0323922 A1 | 11/2016 | Park et al. |
| 2018/0288641 A1* | 10/2018 | Mildh ................. H04W 24/10 |

FOREIGN PATENT DOCUMENTS

| | | |
|---|---|---|
| CN | 103988456 | 8/2014 |
| CN | 104995863 | 10/2015 |
| EP | 2793414 | 10/2014 |
| JP | 2014075676 | 4/2014 |
| JP | 2015504631 | 2/2015 |
| JP | 2015531198 | 10/2015 |
| JP | 2016-508346 | 3/2016 |
| JP | 2016129393 | 7/2016 |
| JP | 2016528776 | 9/2016 |
| KR | 1020120074255 | 7/2012 |
| KR | 1020140078236 | 6/2014 |
| WO | 2012091420 | 7/2012 |
| WO | 2013127310 | 9/2013 |
| WO | 2013162333 | 10/2013 |
| WO | 2016163805 | 10/2016 |

OTHER PUBLICATIONS

European Patent Office Application Serial No. 17890201.1, Search Report dated Sep. 16, 2020, 8 pages.

The State Intellectual Property Office of the People's Republic of China Application Serial No. 201780088122.2, Office Action dated Jun. 19, 2020, 21 pages.

U.S. Appl. No. 16/476,745, Office Action dated Jan. 27, 2021, 9 pages.

U.S. Appl. No. 16/476,745, Final Office Action dated May 3, 2021, 10 pages.

PCT International Application No. PCT/KR2017/014701, Written Opinion of the International Searching Authority dated Apr. 16, 2018, 21 pages.

ZTE, "Discussion on duplex and interference management," 3GPP TSG-RAN WG1 #87, R1-1612156, Nov. 2016, 10 pages.

LG Electronics, "Initial simulation results for eIMTA PDSCH test," 3GPP TSG-RAN WG4 #73, R1-147837, Nov. 2014, 3 pages.

Huawei, HiSilicon, "Physical layer signaling design for TDD eIMTA," 3GPP TSG-RAN WG1 #74bis, R1-134049, Oct. 2013, 4 pages.

Japan Patent Office Application Serial No. 2019-537219, Office Action dated Aug. 4, 2020, 8 pages.

Convida Wireless, "Discussion on Interference Measurement in NR," 3GPP TSG-RAN WG1 #87, R1-1613016, Nov. 2016, 4 pages.

AT&T, "Design of Interference Measurement and Feedback in NR," 3GPP TSG-RAN1 Ad Hoc Meeting, R1-1701202, Jan. 2016, 6 pages.

ZTE, "Sensing based scheme for dynamic TDD in NR," 3GPP TSG-RAN1 Meeting #87, R1-1612157, Nov. 2016, 5 pages.

Korean Intellectual Property Office Application Serial No. 10-2019-7020669, Notice of Allowance dated Dec. 21, 2022, 3 pages.

The State Intellectual Property Office of the People's Republic of China Application Serial No. 201780088122.2, Office Action dated Nov. 23, 2020, 13 pages.

Japan Patent Office Application No. 2019-537219, Office Action dated Mar. 23, 2021, 4 pages.

\* cited by examiner

FIG. 14a
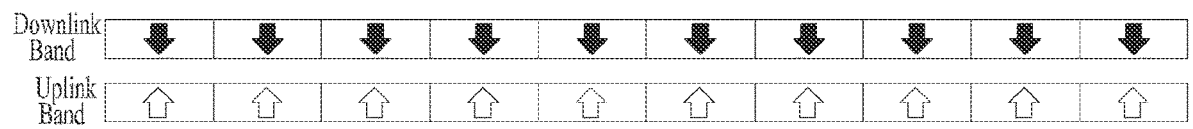

Measure on cross - link interference?

METHOD FOR REPORTING MEASUREMENT DATA, AND TERMINAL THEREFOR

CROSS-REFERENCE TO RELATED APPLICATIONS

This application is a continuation of U.S. patent application Ser. No. 16/476,745, filed on Jul. 9, 2019, which is the National Stage filing under 35 U.S.C. 371 of International Application No. PCT/KR2017/014701, filed on Dec. 14, 2017, which claims the benefit of U.S. Provisional Application No. 62/443,813, filed on Jan. 9, 2017, and 62/543,980, filed on Aug. 11, 2017, the contents of which are all hereby incorporated by reference herein in their entirety.

TECHNICAL FIELD

The present invention relates to wireless communication and, more particularly to a method of reporting measurement information and a user equipment (UE) therefor.

BACKGROUND ART

Compared to conventional half duplex communication in which time or frequency resources are divided orthogonally, full duplex communication doubles a system capacity in theory by allowing a node to perform transmission and reception simultaneously.

FIG. 1 is a conceptual view of a UE and a Base Station (BS) which support Full Duplex Radio (FDR).

In the FDR situation illustrated in FIG. 1, the following three types of interference are produced.

Intra-device self-interference: Because transmission and reception take place using the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE inter-link interference: An Uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS.

DETAILED DESCRIPTION OF THE INVENTION

Technical Problems

An object of the present invention is to provide a method of reporting measurement information.

Another object of the present invention is to provide a UE for reporting measurement information.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

According to an aspect of the present invention, provided herein is a method of reporting measurement information by a user equipment (UE), including receiving interference measurement resource (IMR) configuration information or sounding reference signal (SRS) configuration information, for UE-to-UE cross-link interference measurement, from a base station (BS); measuring UE-to-UE cross-link interference based on the IMR configuration information or the SRS configuration information; and transmitting a report including a measured UE-to-UE cross-link interference value to the BS.

The IMR configuration information may include information about a location of an IMR, and the UE-to-UE cross-link interference may be measured at the location of the IMR. The IMR configuration information or the SRS configuration information may be cell-specifically, group-specifically, or UE-specifically configured. The IMR configuration information or the SRS configuration information may be received through radio resource control (RRC) signaling, downlink control information (DCI), or a group-common physical downlink control channel (PDCCH).

The UE-to-UE cross-link interference may be measured when a predetermined condition is satisfied. The predetermined condition may be satisfied when a transmission direction of the BS is downlink (DL) and a transmission direction of a neighbor BS is uplink (UL).

The method may further include receiving control information indicating whether the IMR configuration information is valid and whether the UE-to-UE cross-link interference needs to be measured. When the control information indicates that the IMR configuration information is valid and the UE-to-UE cross-link interference needs to be measured, the UE-to-UE cross-link interference may be measured.

The report including the measured UE-to-UE cross-link interference value may be periodically or aperiodically transmitted. The report may be aperiodically transmitted when the measured UE-to-UE cross-link interference value is greater than a preset threshold or when a difference between the measured UE-to-UE cross-link interference value and a previously reported measured value is greater than a preset threshold difference.

The SRS configuration information may include information about a location of a transmission resource of an SRS and a sequence of the SRS, and the UE-to-UE cross-link interference may be measured based on the SRS. The report may include information about a predetermined number of higher measurement values and SRS configuration indexes corresponding to the higher measurement values.

In another aspect of the present invention, provided herein is a user equipment (UE) for reporting measurement information, including a receiver configured to receive interference measurement resource (IMR) configuration information or sounding reference signal (SRS) configuration information, for UE-to-UE cross-link interference measurement, from a base station (BS); a processor configured to measure UE-to-UE cross-link interference based on the IMR configuration information or the SRS configuration information; and a receiver configured to transmit a report including a measured UE-to-UE cross-link interference value to the BS.

The IMR configuration information may include information about a location of an IMR, and the processor may be configured to measure the UE-to-UE cross-link interference at the location of the IMR.

The SRS configuration information may include information about a location of a transmission resource of an SRS and a sequence of the SRS, and the processor may be configured to measure the UE-to-UE cross-link interference based on the SRS. The IMR configuration information or the SRS configuration information may be cell-specifically, group-specifically, or UE-specifically configured.

Advantageous Effects

According to proposals of the present invention, communication performance of a flexible duplex wireless transmission scheme may be remarkably improved by relieving or solving cross-link interference in the flexible duplex wireless transmission scheme.

The effects that can be achieved through the embodiments of the present disclosure are not limited to what has been particularly described hereinabove and other effects which are not described herein can be derived by those skilled in the art from the following detailed description.

DESCRIPTION OF DRAWINGS

The accompanying drawings, which are included to provide a further understanding of the invention and are incorporated in and constitute a part of this specification, illustrate embodiments of the invention.

FIG. 14a is a diagram showing an example of FDD/TDD frame structure in LTE/LTE-A system

BEST MODE FOR CARRYING OUT THE INVENTION

Figure 1:
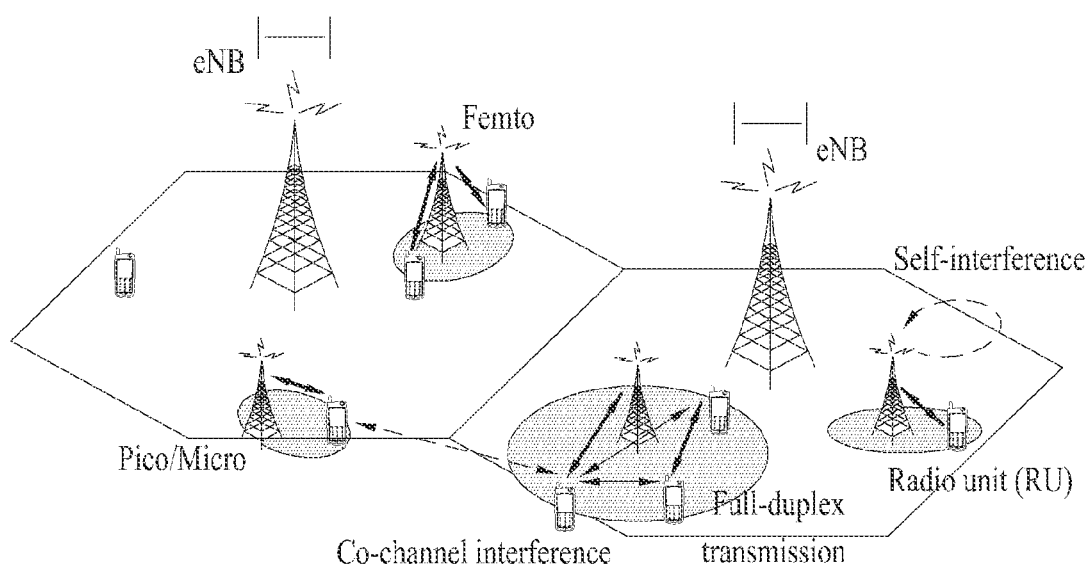
FIG. 1 is a view exemplarily illustrating a network supporting a full/half duplex communication operation mode of a UE according to the present invention.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

Figure 2:
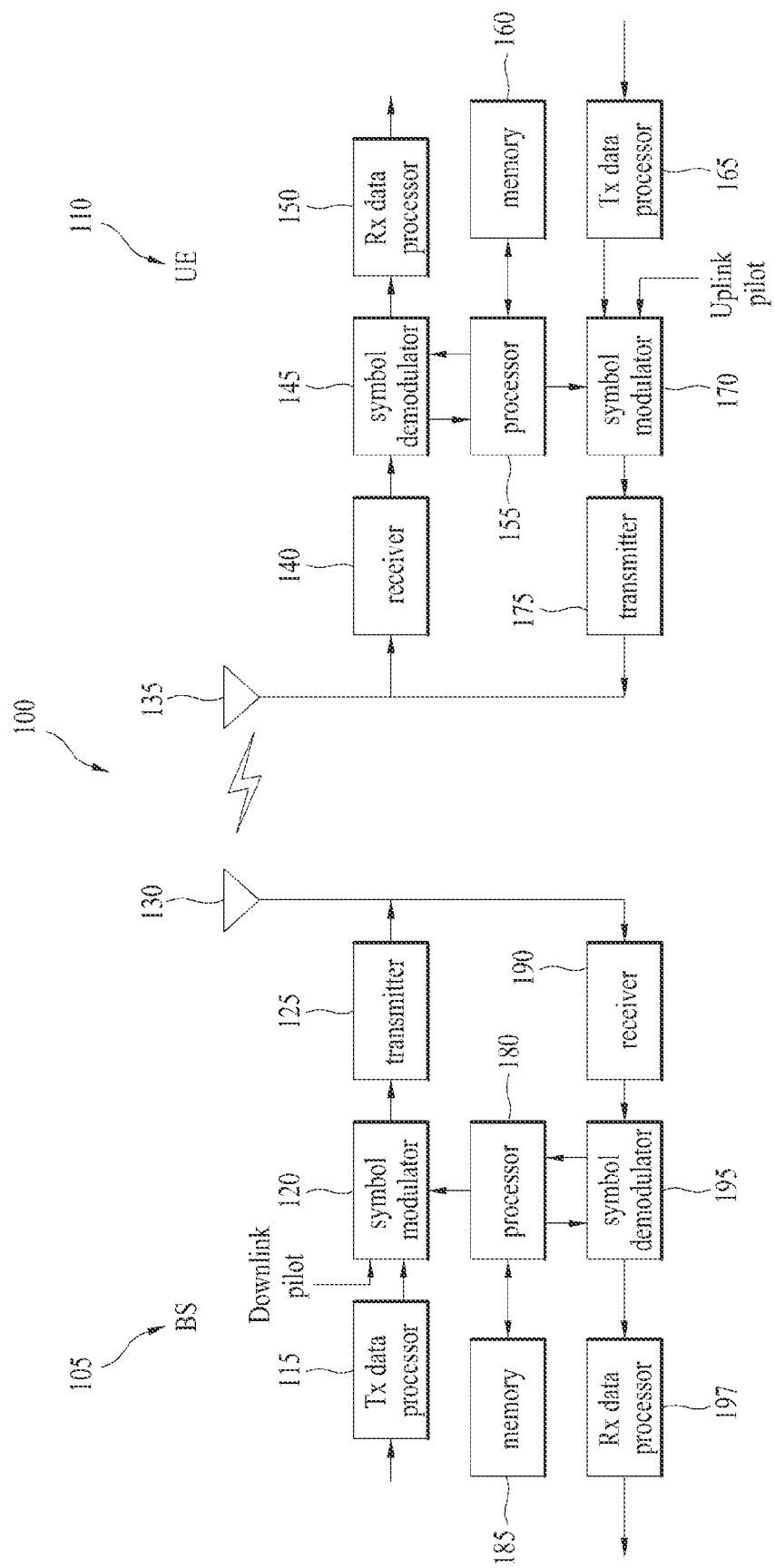
FIG. 2 is a block diagram for configurations of a base station 105 and a user equipment 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
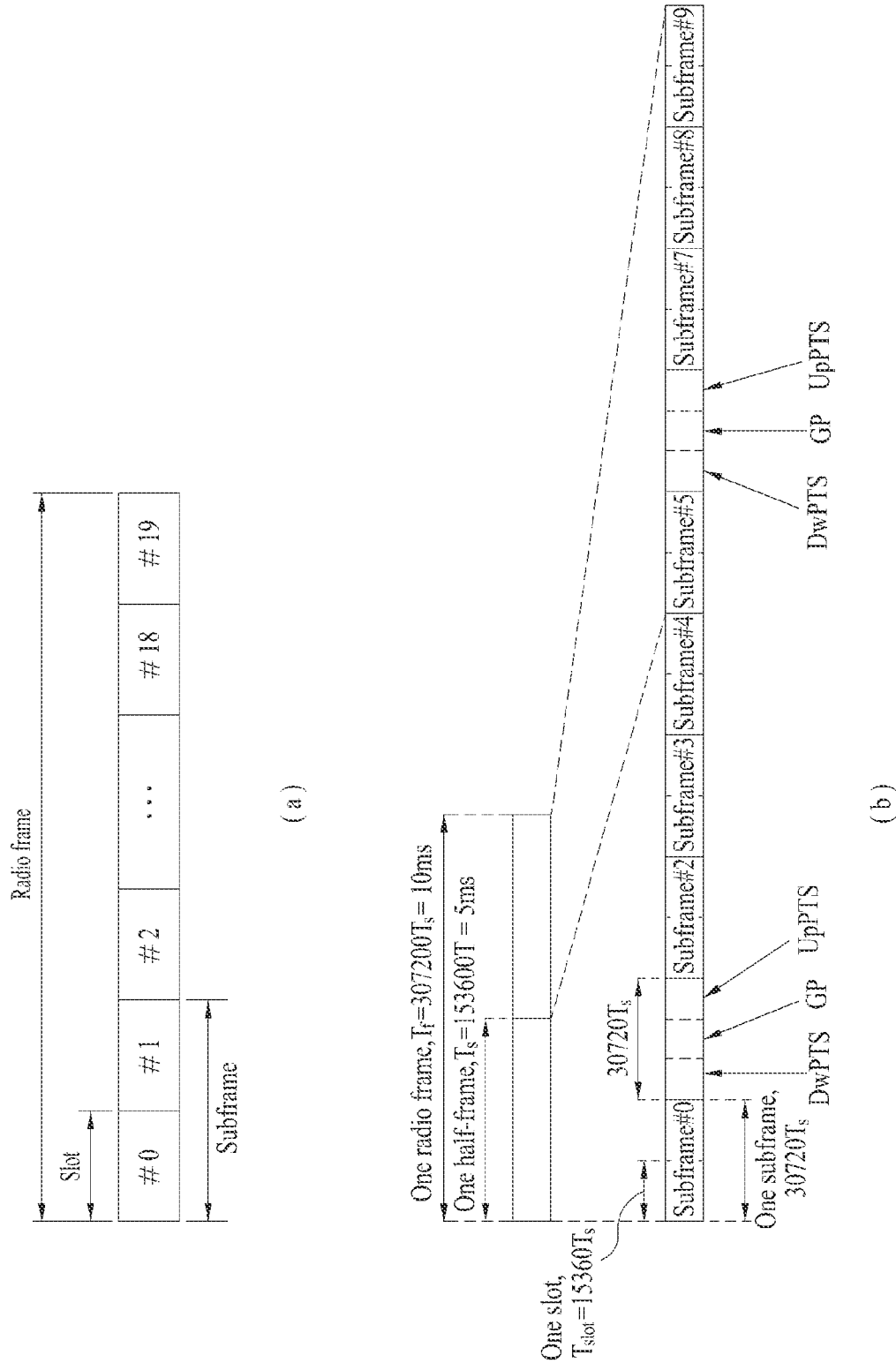
FIG. 3 is a diagram illustrating exemplary radio frame structures used in 3GPP LTE/LTE-A system, which is an example of a wireless communication system.

FIG. 3 illustrates exemplary radio frame structures used in 3GPP LTE/LTE-A system, which is an example of a wireless communication system.

Regarding the usual representation of wireless transmission, when wireless transmission is performed between a base station and a wireless UE as wireless devices, a transmission from the base station to the wireless UE and a transmission from the wireless UE to the base station are commonly named a downlink (DL) transmission and an uplink (UL) transmission, respectively, a way of distinguishing radio resources between the downlink transmission and the uplink transmission is defined as duplex. A case of bidirectional transmission/reception by dividing a frequency band into a downlink transmission band and an uplink transmission band is represented as Frequency Division Duplex (FDD). And, a case of transmission/reception on the same frequency band by dividing a time domain radio resource into a downlink time duration resource and an uplink time duration resource is represented as Time Division Duplex (TDD).

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 3(*a*) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 3(*b*) illustrates the type-2 radio frame structure.

A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal.

Each half frame includes 5 subframes. A subframe denoted by 'D' is a subframe for a DL transmission, a subframe denoted by 'U' is a subframe for a UL transmission, a subframe denoted by 'S' is a special subframe including a downlink pilot time slot (DwPTS), a guard period (GP) and an uplink pilot time slot (UpPTS). The DwPTS is used for an initial cell search, a synchronization or a channel estimation in a user equipment. The UpPTS is used for a channel estimation in a base station and an uplink transmission synchronization of a user equipment. The guard period is a period for removing interference generated from an uplink due to a multipath delay of a DL signal between the uplink and the downlink.

In case of 5 ms DL-UL switch-point period, a special subframe S exists in every half frame. In case of 5 ms DL-UL switch-point period, it exists in a $1^{st}$ half frame only. Subframe indexes 0 and 5 (subframe 0 and subframe 5) and DwPTS correspond to the interval for a DL transmission only. The UpPTS and a subframe right contiguous with the special subframe always correspond to an interval for a UL transmission. If multi-cells are aggregated, a user equipment can assume the same UL-DL configuration across all cells. And, guard periods of special subframes in different cells overlap each other by 1456 Ts at least. The above-described structures of the radio frame are just exemplary. And, the number of subframes included in a radio frame, the number of slots included in the subframe and the number of symbols included in the slot may be modified in various ways.

Table 1 in the following indicates a configuration (length of DwPTS/GP/UpPTS) of a special frame.

Referring to Table 2, in the 3GPP LTE system, there are 7 types of UL-DL configurations in the type-2 frame structure. The respective configurations may differ from each other in the numbers or locations of DL subframes, special subframes and UL subframes. In the following description, various embodiments of the present invention shall be explained based on the UL-DL configurations of the type-2 frame structure shown in Table 2. Table 3 shows k values for TDD configurations 0 to 6.

TABLE 3

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | | 7 | 4 | | | | 7 | 4 | | |
| 1 | | | 4 | | 6 | | | 4 | | 6 |
| 2 | | | 6 | | | | | 6 | | |
| 3 | | 6 | | | | | | | 6 | 6 |
| 4 | | | | | | | | | 6 | 6 |
| 5 | | | | | | | | | 6 | |
| 6 | | 6 | 4 | | | | 7 | 4 | | 6 |

In the type-1 frame structure, HARQ-ACK received on PHICH assigned to a UE in subframe i is related to PUSCH transmission in subframe i-4. In the UL/DL configurations 1 to 6 of the type-2 frame structure, HARQ-ACK received on PHICH assigned to a UE in subframe i is related to PUSCH transmission in subframe i-k (k is shown in Table 3).

A UE HARQ-ACK procedure in 3GPP LTE/LTE-A system is schematically described as follows. The present

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Table 2 shows UL-DL configuration in the type-2 frame structure of 3GPP LTE system.

invention shall be described based on the UE HARQ-ACK procedure in 3GPP LTE/LTE-A system.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 4

For Frame Structure type 2 UL/DL configuration 1-6, an HARQ-ACK received on the PHICH assigned to a UE in subframe i is associated with the PUSCH transmission in the subframe i-k as indicated by the table 3.
For Frame Structure type 2 UL/DL configuration 0, an HARQ-ACK received on the PHICH in the resource corresponding to $I_{PHICH} = 0$, assigned to a UE in subframe i is associated with the PUSCH transmission in the subframe i-k as indicated by the table 3.
If, for Frame Structure type 2 UL/DL configuration 0, an HARQ-ACK received on the PHICH in the resource corresponding to $I_{PHICH} = 1$, assigned to a UE in subframe i is associated with the PUSCH transmission in the subframe i-6.
The physical layer in the UE shall deliver indications to the higher layers as follows:
For downlink subframe i, if a transport block was transmitted in the associated PUSCH subframe then:
if ACK is decoded on the PHICH corresponding to the transport block in subframe i, ACK for that transport block shall be delivered to the higher layers;
else NACK for that transport block shall be delivered to the higher layers.
For downlink subframe i, in case of a retransmission in the associated PUSCH subframe, if a transport block was disabled in the associated PUSCH subframe then ACK for that transport block shall be delivered to the higher layers.

A PHICH assignment procedure in 3GPP LTE/LTE-A system is schematically described as follows. The present invention shall be described based on the PHCI assignment procedure in 3GPP LTE/LTE-A system.

TABLE 6

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

Figure 4:
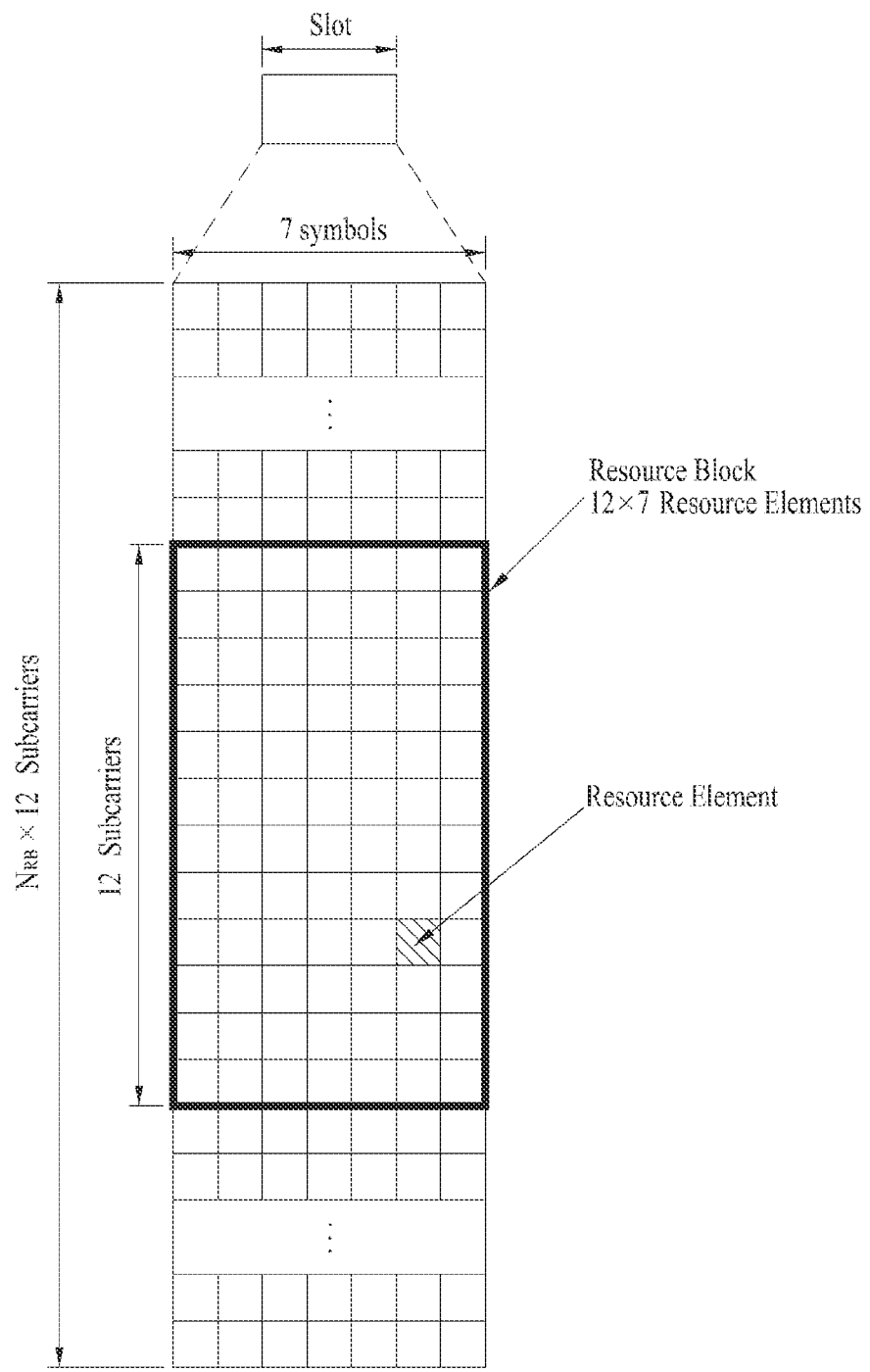
FIG. 4 is a diagram illustrating an exemplary resource grid for the duration of a downlink slot used in 3GPP LTE/LTE-A system, which is an example of a wireless communication system.

FIG. 4 is a diagram illustrating an exemplary resource grid for the duration of a downlink slot used in 3GPP LTE/LTE-A system, which is an example of a wireless communication system;

Referring to FIG. 4, a DL slot includes a plurality of OFDM symbols in a time domain. One DL slot includes 7 (or 6) OFDM symbols and a resource block may include 12 subcarriers in a frequency domain. Each element on a resource grid is called a resource element (RE). One RB includes 12×7 or 12×6 REs. The number $N_{RB}$ of RBs included in the DL slot depends on a DL transmission band. A structure of a UL slot is identical to that of the DL slot but OFDM symbol is replaced by SC-FDMA symbol.

Figure 5:
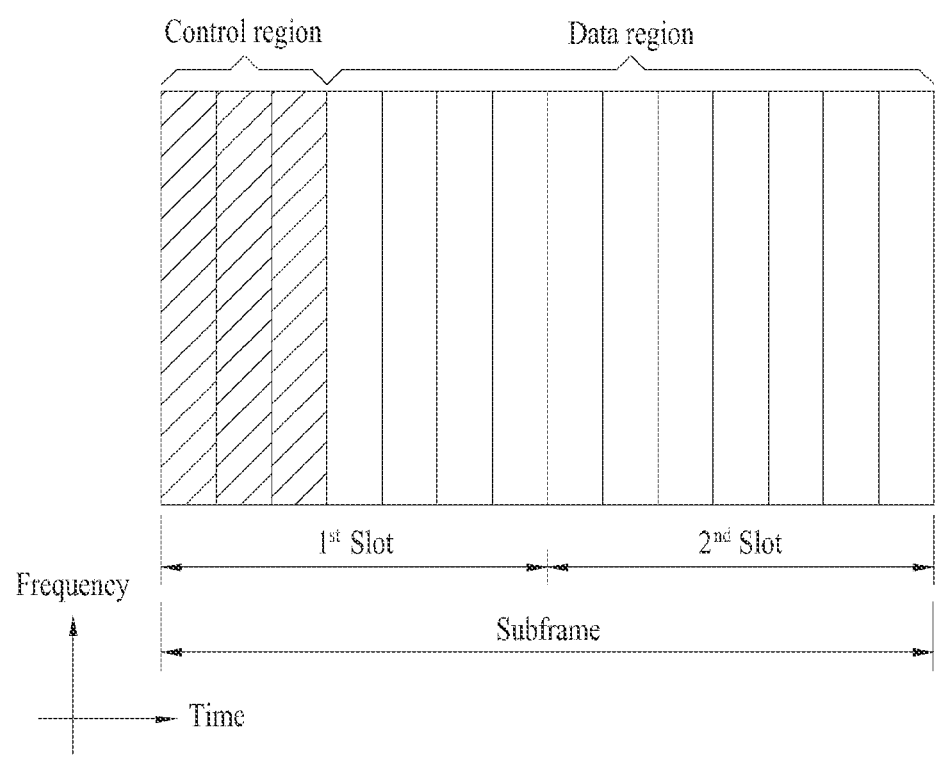
FIG. 5 is a diagram illustrating an exemplary structure of an downlink subframe used in 3GPP LTE/LTE-A system, which is an example of a wireless communication system.

FIG. 5 is a diagram illustrating an exemplary structure of an downlink subframe used in 3GPP LTE/LTE-A system, which is an example of a wireless communication system;

TABLE 5

For PUSCH transmissions scheduled from serving cell in subframe n, a UE shall determine the corresponding PHICH resource of serving cell c in subframe n + kPHICH, where kPHICH is always 4 for FDD and is given in following table 6 for TDD. For subframe bundling operation, the corresponding PHICH resource is associated with the last subframe in the bundle.
The PHICH resource is identified by the index pair ($n_{PHICH}^{group}$, $n_{PHICH}^{seq}$) where $n_{PHICH}^{group}$ is the PHICH group number and $n_{PHICH}^{seq}$ is the orthogonal sequence index within the group as defined by:

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA}/N_{PHICH}^{group} \rfloor + n_{DMRS}) \bmod 2N_{SF}^{PHICH}$$

where
nDMRS is mapped from the cyclic shift for DMRS field (according to following table 6) in the most recent PDCCH with uplink DCI format [4] for the transport block(s) associated with the corresponding PUSCH transmission. nDMRS shall be set to zero, if there is no PDCCH with uplink DCI format for the same transport block, and
if the initial PUSCH for the same transport block is semi-persistently scheduled, or
if the initial PUSCH for the same transport block is scheduled by the random access response grant.
$N_{SF}^{PHICH}$ is the spreading factor size used for PHICH modulation as described in section 6.9.1 in [3].

$$I_{PRB\_RA} = \begin{cases} I_{PRB\_RA}^{lowest\_index} & \text{for the first } TB \text{ of a } PUSCH \text{ with associated } PDCCH \text{ or for the case of no associated } PDCCH \text{ when the number of negatively acknowledged } TBs \text{ is not equal to the number of } TBs \text{ indicated in the most recent } PDCCH \text{ associated with the corresponding } PUSCH \\ I_{PRB\_RA}^{lowest\_index} + 1 & \text{for a second } TB \text{ of a } PUSCH \text{ with associated } PDCCH \end{cases}$$

where $I_{PRB\_RA}^{lowest\_index}$ is the lowest PRB index in the first slot of the corresponding PUSCH transmission
$N_{PHICH}^{group}$ is the number of PHICH groups configured by higher layers as described in section 6.9 of [3], $$I_{PHICH} = \begin{cases} 1 & \text{for } TDD \ UL/DL \text{ configuration 0 with } PUSCH \text{ transmission in subframe } n = 4 \text{ or } 9 \\ 0 & \text{otherwise} \end{cases}$$

Referring to FIG. 5, up to three(four) OFDM symbols at the start of the first slot in a downlink subframe are used for a control region to which control channels are allocated and the other OFDM symbols of the downlink subframe are used for a data region to which a PDSCH is allocated. Downlink control channels used in the LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission.

Control information transmitted on PDCCH is called DCI (downlink control information). Regarding DCI formats, Format 0 is defined for uplink and Format 1, Format 1A, Format 1B, Format 1C, Format 1D, Format 2, Format 2A, Format 3, Format 3A and the like are defined for downlink. Depending on usages, DCI format selectively includes such information as hopping flag, RB assignment, MCS (modulation coding scheme), RV (redundancy version), NDI (new data indicator), TPC (transmit power control), cyclic shift DM RS (demodulation reference signal), CQI (channel quality information) request, HARQ process number, TPMI (transmitted precoding matrix indicator), PMI (precoding matrix indicator) confirmation and the like.

PDCCH carries transmission format and resource allocation information of DL-SCH (downlink shared channel), transmission format and resource allocation information of UL-SCH (uplink shared channel), paging information on PCH (paging channel), system information on DL-SCH, resource allocation information of an upper-layer control message such as a random access response transmitted on PDSCH, Tx power control command set for individual user equipments within a user equipment group, Tx power control command, activation indication information of VoIP (voice over IP) and the like. A plurality of PDCCHs may be transmitted in a control region. A user equipment can monitor a plurality of PDCCHs. PDCCH is transmitted on aggregation of at least one or more contiguous CCEs (control channel elements). In this case, the CCE is a logical assignment unit used to provide PDCCH with a coding rate based on a radio channel state. The CCE corresponds to a plurality of REGs (resource element groups). PDCCH format and the number of PDCCH bits are determined depending on the number of CCEs. A base station determines PDCCH format in accordance with DCI to transmit to a user equipment and attaches CRC (cyclic redundancy check) to control information. The CRC is masked with an identifier (e.g., RNTI (radio network temporary identifier)) in accordance with an owner or a purpose of use. For instance, if PDCCH is provided for a specific user equipment, CRC may be masked with an identifier (e.g., C-RNTI (cell-RNTI)) of the corresponding user equipment. If PDCCH is provided for a paging message, CRC may be masked with a paging identifier (e.g., P-RNTI (paging-RNTI)). If PDCCH is provided for system information (particularly, SIC (system information block)), CRC may be masked with SI-RNTI (system information-RNTI). And, if PDCCH is provided for a random access response, CRC may be masked with RA-RNTI (random access-RNTI).

Figure 6:
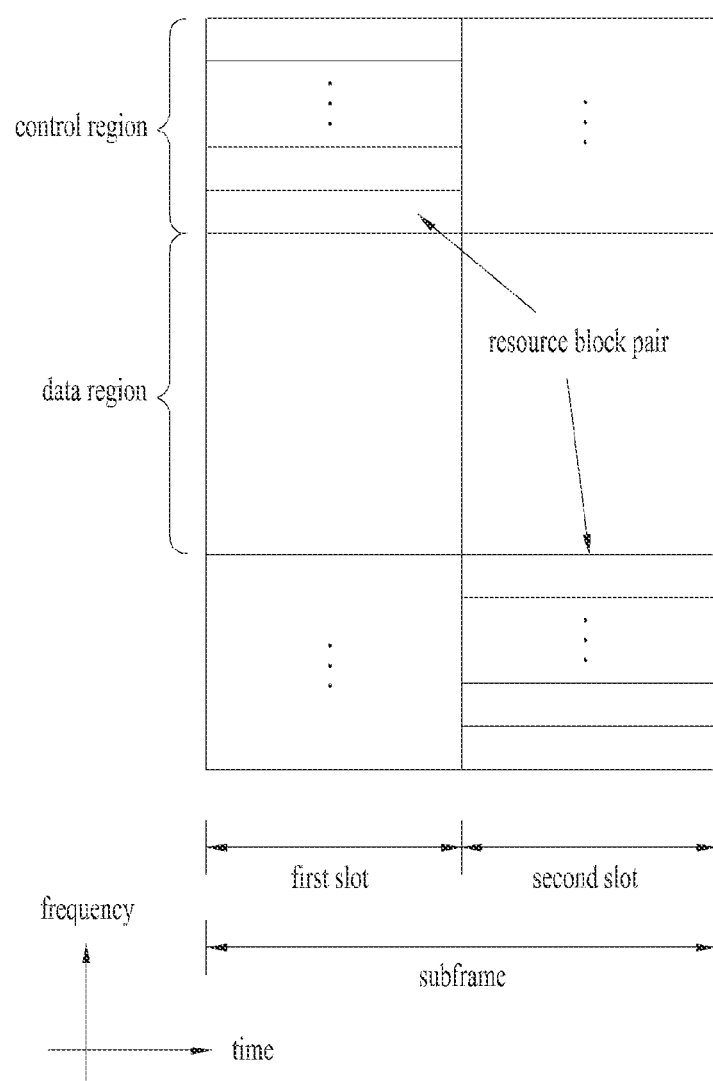
FIG. 6 is a diagram illustrating an exemplary structure of a uplink subframe used in 3GPP LTE/LTE-A system, which is an example of a wireless communication system.

FIG. 6 is a diagram illustrating an exemplary structure of a uplink subframe used in 3GPP LTE/LTE-A system, which is an example of a wireless communication system.

Referring to FIG. 6, a UL subframe includes a plurality of slots (e.g., 2 slots). Each of the slots can include SC-FDMA symbols of which number varies in accordance with a CP length. The UL subframe is divided into a data region and a control region in a frequency domain. The data region includes PUSCH and is used to transmit such a data signal as audio and the like. The control region includes PUCCH and is used to transmit uplink control information (UCI). The PUCCH includes an RB pair situated at both end portions of the data region on a frequency axis and hops using a slot as a boundary.

PUCCH can be used to transmit the following control information.

SR (scheduling request): this is information used to request an uplink UL-SCH resource. This is transmitted by OOK (on-off keying).

HARQ ACK/NACK: This is a response signal for a DL data packet on PDSCH. This indicates whether the DL data packet is successfully received. In response to a single DL codeword, 1-bit ACK/NACK is transmitted. In response to two DL codewords, 2-bit ACK-NACK is transmitted.

CQI (channel quality indicator): This is the feedback information on a DL channel. MIMO (multiple input multiple output) related feedback information includes RI (rank indicator), PMI (precoding matrix indicator), PTI (precoding type indicator) and the like. 20 bits are used per subframe.

A size of control information (UCI) transmittable in a subframe by a user equipment depends on the number of SC-FDMAs available for a control information transmission. The SC-FDMA available for the control information transmission means SC-FDMA symbol remaining after excluding SC-FDMA symbol for a reference signal transmission from a subframe. In case of an SRS (sounding reference signal) configured subframe, a last SC-FDMA symbol of the subframe is excluded as well. A reference signal is used for coherent detection of PUCCH. And, the PUCCH supports 7 formats depending on transmitted informations.

Since an FDR transceiving system capable of transmitting and receiving a UL signal and a DL signal on the same frequency band simultaneously can double frequency efficiency (spectral efficiency) to the maximum in comparison with an existing system that transmits and receives a UL signal and a DL signal by dividing frequency or time, it is getting the spotlight as one of the core technologies of the next generation 5G mobile communication system.

FDR using a single frequency transmission band can be defined as a transmission resource configuration scheme of simultaneously performing transmission and reception through a single frequency transmission band in aspect of a random wireless device. As one special example of this, it can be represented as a transmission resource configuration scheme of simultaneously performing 'DL transmission and UL reception of a base station' and 'DL reception and UL transmission of a wireless UE' through a single frequency transmission band regarding the wireless communication between a general base station (or, relay, relay node, Remote Radio Head (RRH), etc.) and a wireless UE. As another example, it can be represented as a transmission resource configuration scheme of simultaneously performing transmissions and receptions between wireless UEs on the same frequency transmission band in a situation of device-to-device direct communication (D2D) between wireless UEs. Although proposed technologies related to FDR are described in this disclosure by exampling a case of wireless transmission/reception between a general base station and a wireless UE, the present invention includes a case of a network wireless device performing wireless transmission/reception with a UE as well as a general base station and also includes a case of direct communication between UEs.

Figure 7:
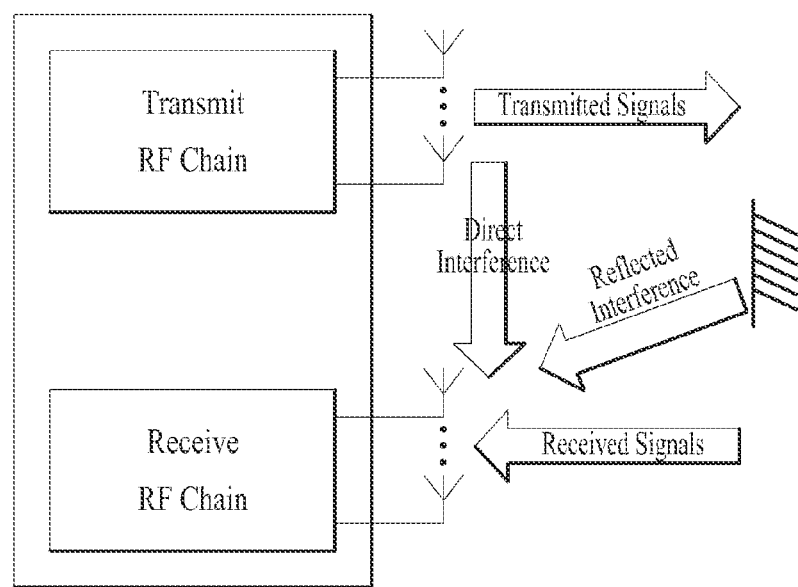
FIG. 7 is a diagram showing the concept of a transmission/reception link and self-interference (SI) in an FDR communication situation.

FIG. 7 is a diagram showing the concept of a transmission/reception link and self-interference (SI) in an FDR communication situation.

As shown in FIG. 7, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient self-IC is necessary to operate the FDR system.

To effectively operate the FDR system, self-IC requirements with respect to the maximum transmit power of devices (in the case where FDR is applied to a mobile communication system (BW=20 MHz)) may be determined as illustrated in Table 7 below.

TABLE 7

| Node Type | Max. Tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to Table 7, it may be noted that to effectively operate the FDR system in a 20-MHz BW, a UE needs 119-dBm Self-IC performance. A thermal noise value may be changed to $N_{0,BW}$=−174 dBM+10*$\log_{10}$ (BW) according to the BW of a mobile communication system. In [Table 1], the thermal noise value is calculated on the assumption of a 20-MHz BW. In relation to [Table 1], for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 8:
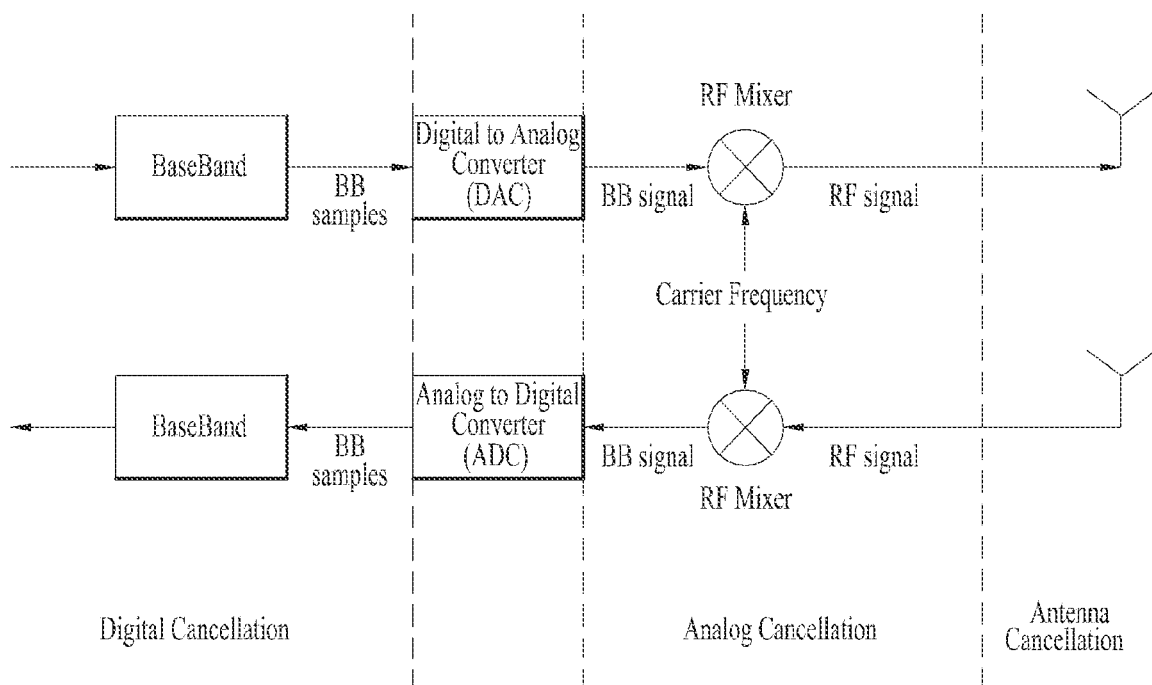
FIG. 8 is a view illustrating positions at which three Self-IC schemes are applied, in a Radio Frequency (RF) Tx and Rx end (or an RF front end) of a device.

FIG. 8 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC: Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC: Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 9:
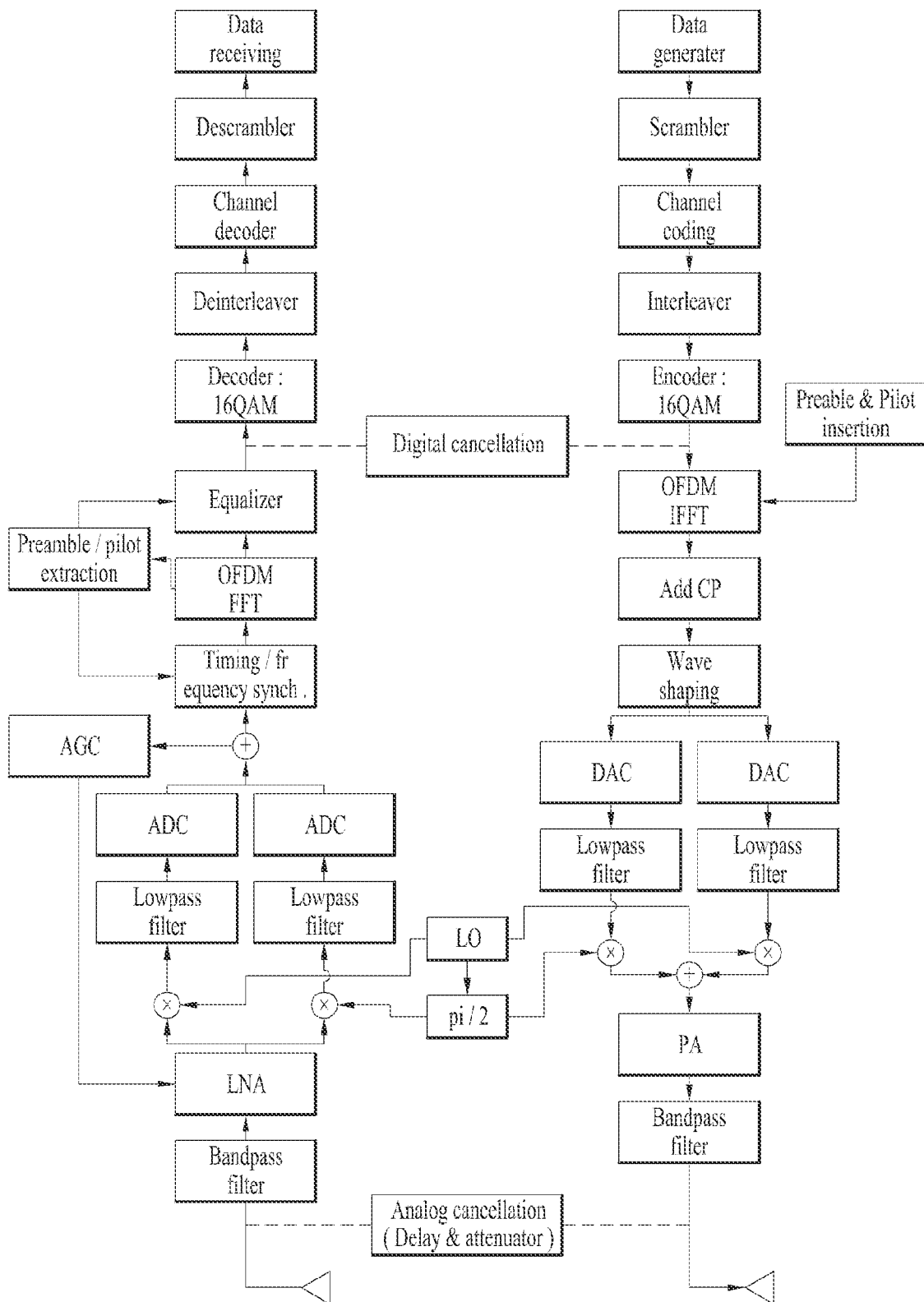
FIG. 9 is a block diagram of a Self-IC device in a proposed communication apparatus in an OFDM communication environment based on FIG. 8.

FIG. 9 is a block diagram of a Self-IC device in a proposed communication apparatus in an OFDM communication environment based on FIG. 8.

While FIG. 9 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 9 is a conceptual view of Self-IC though separation of a Tx antenna from an Rx antenna, if antenna Self-IC is performed using a single antenna, the antenna may be configured in a different manner from in FIG. 9.

3GPP LTE system operates based on fixed UL and DL bands for which both TDD and FDD are determined in advance like Table 8. In case of TDD, TDD configuration can be determined cell-specifically. Yet, in case of FDD, determined UL and DL bands are located on different frequency bands, respectively. Since one band is determined to be utilized for the usage of either UE transmission or base station transmission, transmission on other bands cannot be performed. Table 8 shows E-UTRA frequency bands.

TABLE 8

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1960 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |

TABLE 8-continued

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | |
| 21 | 1447.9 MHz-1462.9 MHz | 1495.9 MHz-1510.9 MHz | FDD |
| 24 | 1626.5 MHz-1660.5 MHz | 1525 MHz-1559 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |

Note:
[1]Band 6 is not applicable.

Yet, an actual data situation of a UE has the characteristic of asymmetric data traffic. In most of communication environments, DL data traffic is heavier than UL data traffic. And, a traffic amount of about 1:9 between UL and DL has been reported. In such an asymmetric data traffic situation, in case of operating by FDD-LTE on the basis of frequency assignment for the fixed UL and DL transmissions like Table 8, resource utilization may be lowered. To solve such a problem, Flexible FDD wireless transmission scheme was proposed as an early stage of the FDR system.

Flexible FDD system is the technology intending to raise resource use efficiency in accordance with a traffic situation of a UE in a manner of utilizing a UL band as a DL band for a specific time based on a fact that an operation of FDD system is deregulated according to the actual asymmetric data traffic characteristic. The resource use efficiency comparison between the existing FDD-LTE and the flexible FDD wireless transmission scheme is shown in FIG. 10.

Figure 10:
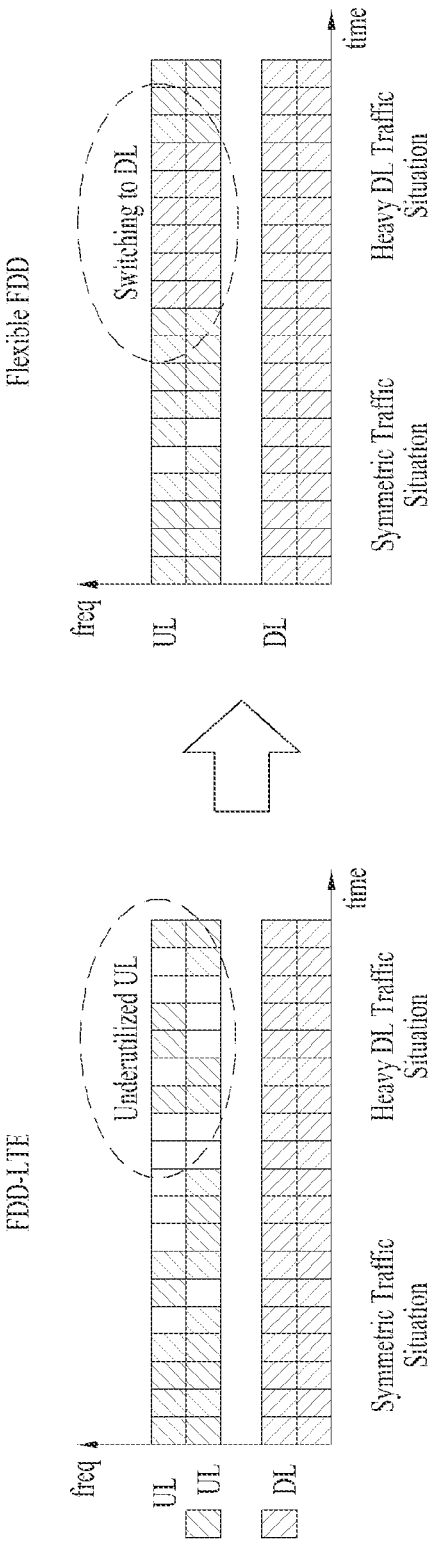
FIG. 10 is a diagram showing the resource use efficiency comparison between the existing FDD-LTE and the flexible FDD wireless transmission scheme (Symmetric traffic situation and heavy DL data traffic situation).

FIG. 10 is a diagram showing the resource use efficiency comparison between the existing FDD-LTE and the flexible FDD wireless transmission scheme (Symmetric traffic situation and heavy DL data traffic situation).

Referring to FIG. 10, as DL and UL resources are mostly used in a symmetric data traffic situation, resource efficiency is high. Yet, in a heavy DL data traffic situation, as resources are not used in case of FDD (FDD-LTE) in an existing LTE system, FIG. 10 clearly shows that frequency resource is wasted. Thus, in order to solve the problem that resource use efficiency is lowered, by utilizing a UL frequency resource as a frequency resource for DL transmission at a specific time, resource efficiency can be raised in a heavy DL data traffic situation. This is shown in detail in FIG. 11 together with a buffer status to transmit in a flexible FDD wireless transmission scheme.

Figure 11:
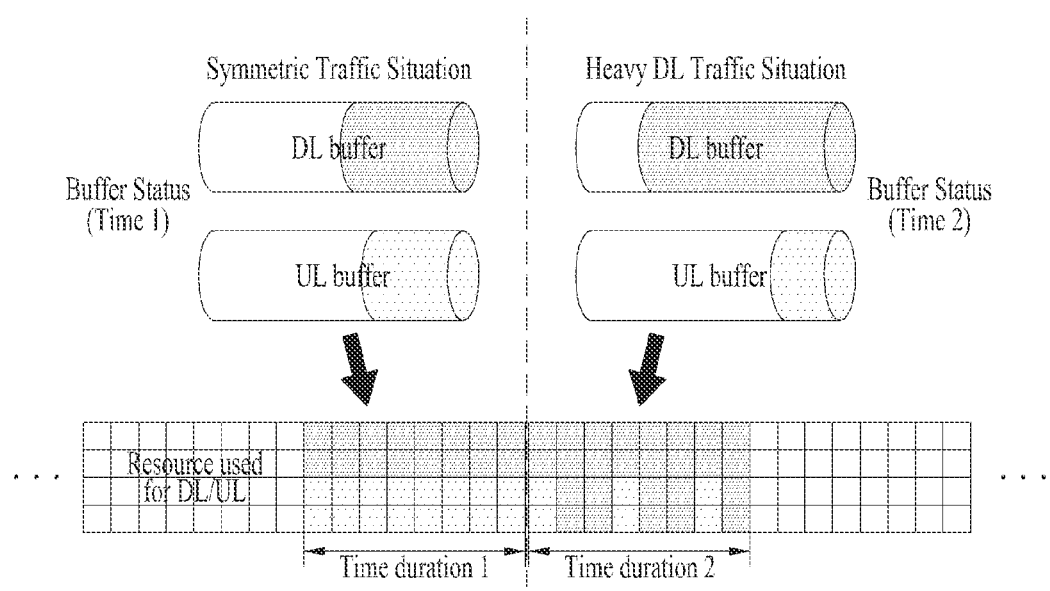
FIG. 11 is a diagram showing resource utilization in flexible FDD.

FIG. 11 is a diagram showing resource utilization in flexible FDD.

Compared to a resource use in case of a symmetric traffic situation, resource efficiency can be raised in a heavy DL traffic situation by utilizing a UL frequency resource as a DL resource for a DL transmission at a specific time.

Referring to FIG. 11, a flexible FDD wireless transmission scheme means a scheme of flexibly configuring a DL frequency resource and a UL frequency resource to be suitable for each service or application program. In this case, a time resource may be configured by a unit such as a time slot configured with one or more transmission symbols, a subframe, a frame or the like. Through this, a wireless transmission resource allocation optimized for a service or application characteristic of an individual wireless UE unit can be supported and the overall frequency use efficiency on the random base station coverage can be advantageously increased as well.

Figure 12:
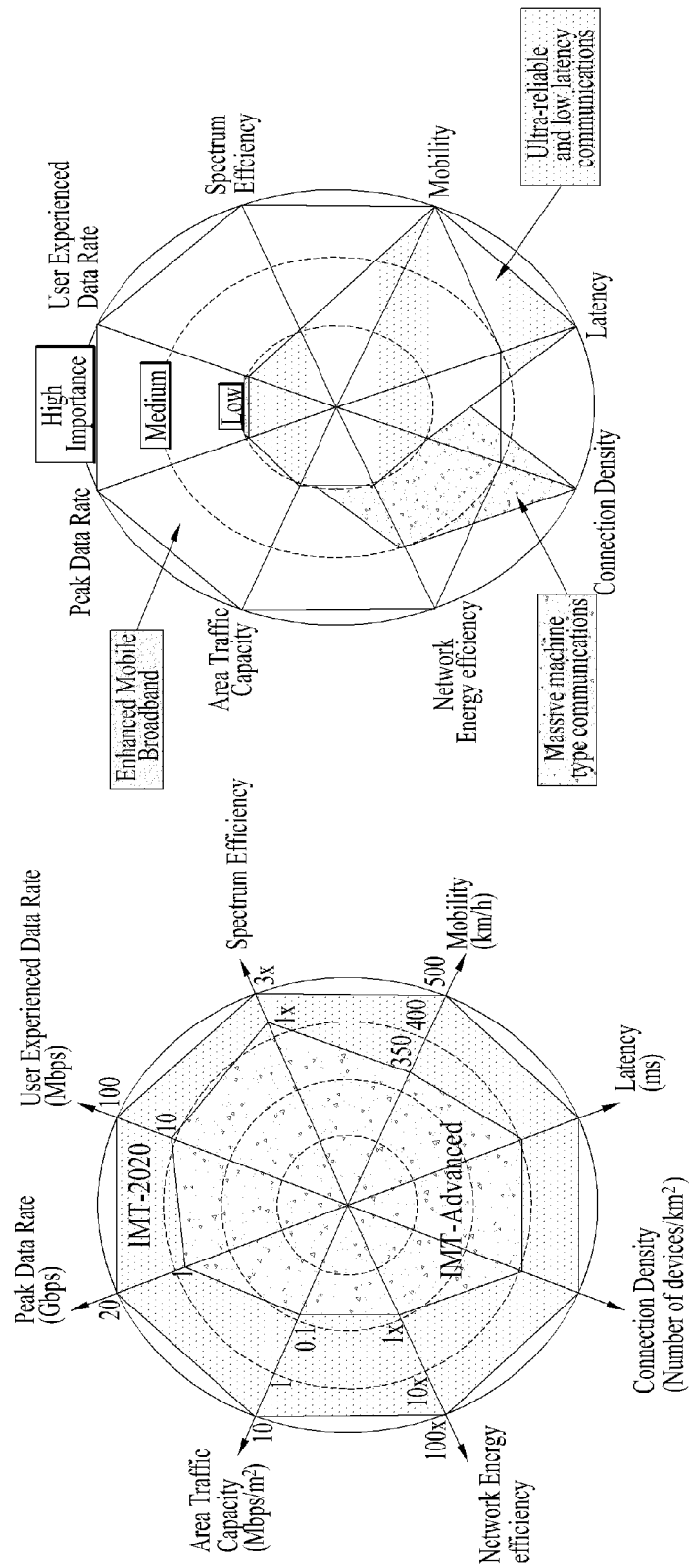
FIG. 12 is a diagram for explaining relation between IMT 2020 core performance requirements for 5G and 5G performance requirements for each service scenario.

FIG. 12 is a diagram for explaining relation between IMT 2020 core performance requirements for 5G and 5G performance requirements for each service scenario.

FIG. 12 illustrates the relation between the core performance requirements for 5G, which are proposed in IMT 2020, and the 5G performance requirements for each service scenario.

In particular, uMTC services have extremely restricted Over-The-Air (OTA) latency requirements and requires high mobility and reliability (OTA Latency: <1 ms, Mobility: >500 km/h, and BLER: <$10^{-6}$).

Figure 13:
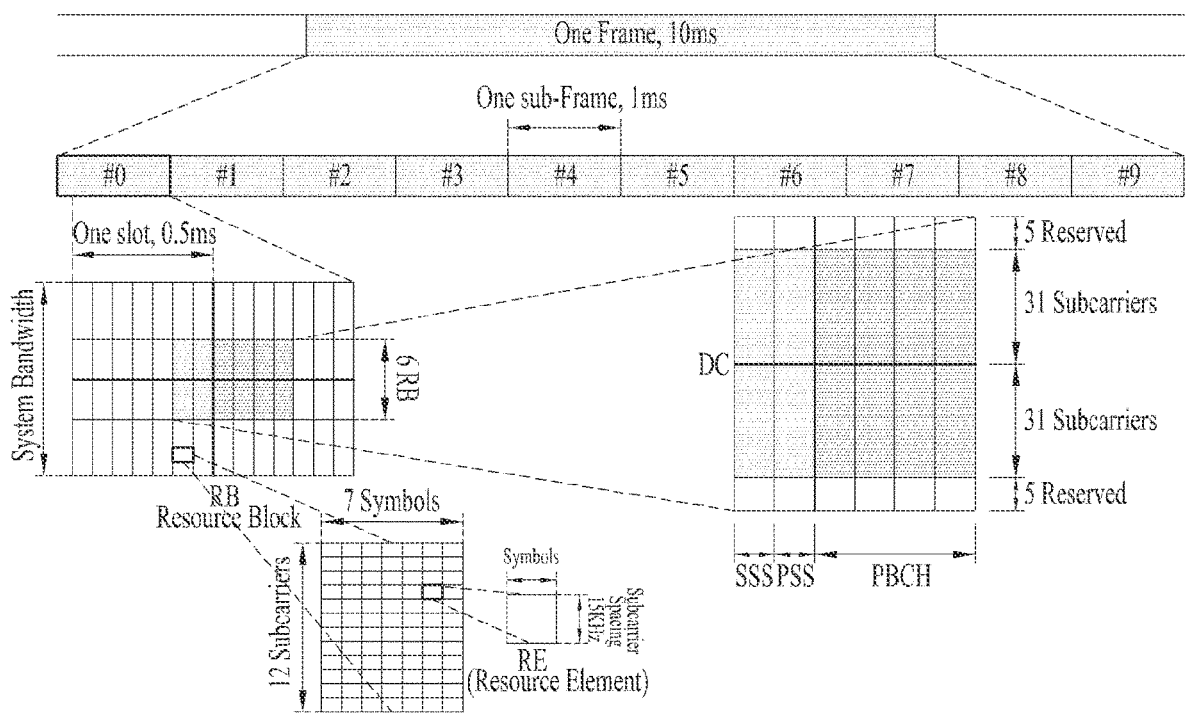
FIG. 13 is a diagram showing the LTE/LTE-A frame structure.

FIG. 13 is a diagram showing the LTE/LTE-A frame structure.

FIG. 13 shows the basic concept of the frame structure of LTE/LTE-A. One fame amounts to 10 ms and includes 10 subframes of 1 ms. One subframe includes 2 slots of 0.5 ms, and one slot includes 7 OFDM (Orthogonal Frequency Division Multiplexing) symbols. One Resource Block (RB) is defined with 12 subcarriers in interval of 15 kHz and 7 OFDM symbols. On the center frequency 6 RBs, a base station transmits Primary Synchronization Signal (PSS) for synchronization, Secondary Synchronization Signal (SSS), and Physical Broadcast Channel (PBCH) for system information. Here, according to Normal/Extended CP (Cyclic Prefix), TDD (Time Division Duplex)/FDD (Frequency Division Duplex), the frame structure, a signal and a channel positions may vary.

FIG. 14a is a diagram showing an example of FDD/TDD frame structure in LTE/LTE-A system.

Referring to FIG. 14a, in case of an FDD frame structure, DL and UL frequency bands are distinct from each other. In case of a TDD frame structure, a DL region and a UL region are distinct from each other within the same band in unit of a subframe.

Figure 14B:
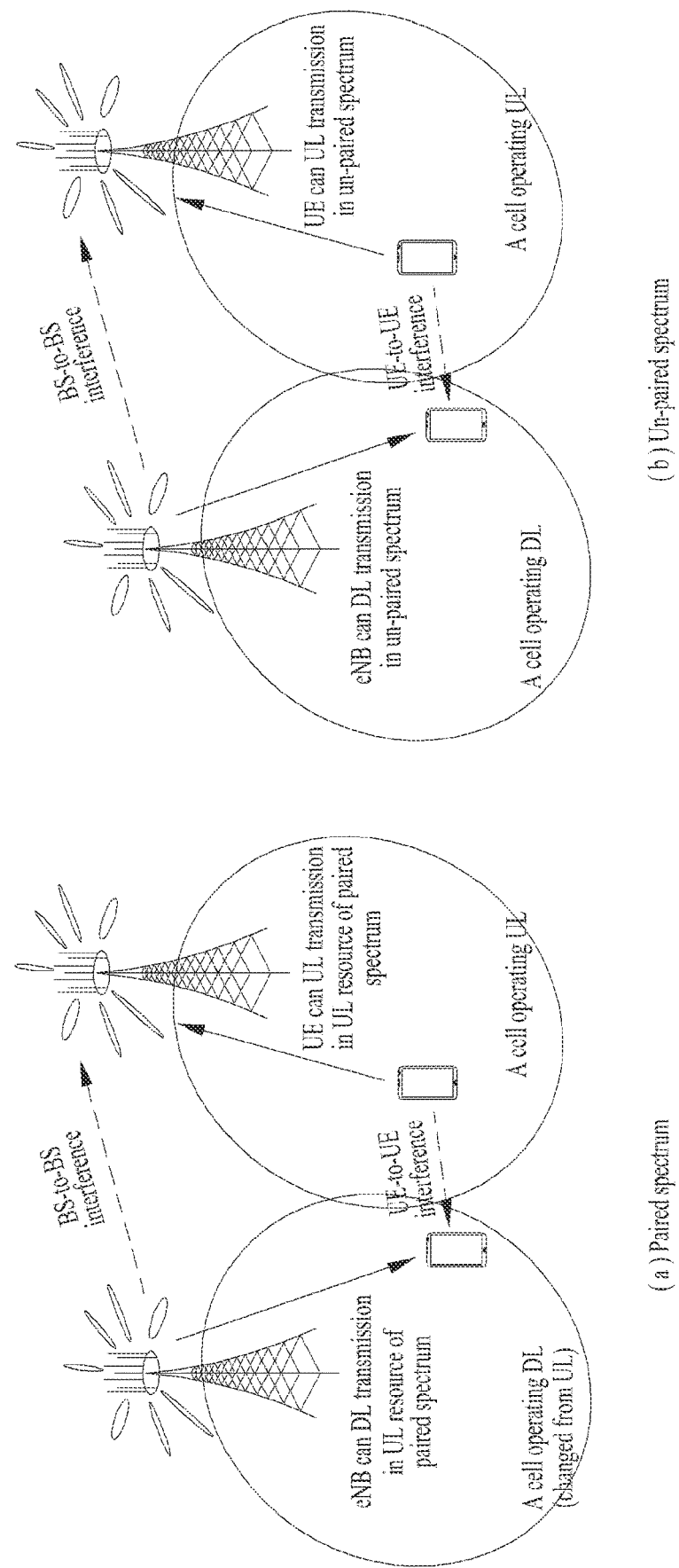
FIG. 14b is a diagram showing an example of the cross-link interference for a TDM flexible duplex operation in a paired/unpaired spectrum.

FIG. 14b is a diagram showing an example of the crosslink interference for a TDM flexible duplex operation in a paired/unpaired spectrum.

Interference supposed to be additionally considered in operating flexible duplex shall be named 'crosslink interference' in the following. Particularly, as an adjacent base station performs a DL/UL operation in a different direction, a DL signal generation of the adjacent base station works as interference on a UL reception of a specific base station. Moreover, a UL signal generation of an adjacent UE works as interference on a DL reception of a specific UE. Such crosslink interference is well shown in FIG. 16 according to a paired spectrum and an unpaired spectrum.

Figure 15:
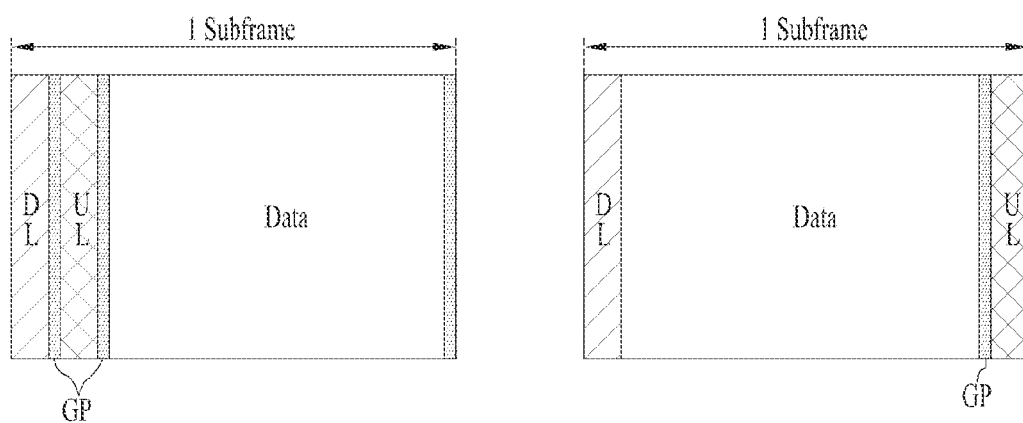
FIG. 15 is a diagram showing an example of a self-contained subframe structure.

FIG. 15 is a diagram showing an example of a self-contained subframe structure.

FIG. 15 shows a self-contained subframe structure to meet a low delay requirement among 5G performance requirements. Regarding a TDD based self-contained subframe structure, resource intervals (e.g., DL control channel and a UL control channel) for DL and UL exits within a single subframe. And, a Guard Period (GP) for solving a problem of interference between DL and UL and a resource interval exist as well.

FIG. 15 (a) shows one example of a self-contained subframe structure. A subframe is configured in order of resource intervals for DL-UL-data and each GP exists between the resource intervals. In FIG. 15 (a), a DL resource interval denoted by DL may be a resource interval for a DL control channel and a UL resource interval denoted by UL may be a resource interval for a UL control channel.

FIG. 15 (b) shows one example of a self-contained subframe structure. A subframe is configured in order of resource intervals for DL-data-UL and a GP exists in front of the UL resource interval only. Likewise, in FIG. 15 (b), a DL resource interval denoted by DL may be a resource interval for a DL control channel and a UL resource interval denoted by UL may be a resource interval for a UL control channel.

Hereinafter, methods of effectively applying a flexible duplex wireless transmission scheme to wireless transmission between the UE and the eNB will be proposed. The eNB expressed throughout the present invention includes a relay, a relay node, a remote radio head (RRH), and the like. The present invention also proposes examples of designing a reference signal (RS) for measuring cross-link interference generated in a flexible duplex wireless transmission scheme and performing signaling supporting such design.

The present invention explains the proposals and then describes the detailed embodiments of the proposals. The proposals and the embodiments of the proposals may be usable in a manner of being coupled or combined together. In the present invention, the crosslink interference means interference generated from a case that an interference-receiving subject is different from an interference-giving subject at a corresponding timing. For example, when the interference-receiving subject is at a DL reception timing and the interference-giving subject is at a UL transmission timing, interference generated from a UL transmission can be called crosslink interference. In the present invention, a UE/base station in position of receiving interference due to crosslink interference shall be represented as a victim UE/TRP and a UE/base station in position of giving interference shall be represented as an aggressor UE/TRP.

An example of cross-link interference in terms of the eNB will be described hereinbelow.

Figure 16:
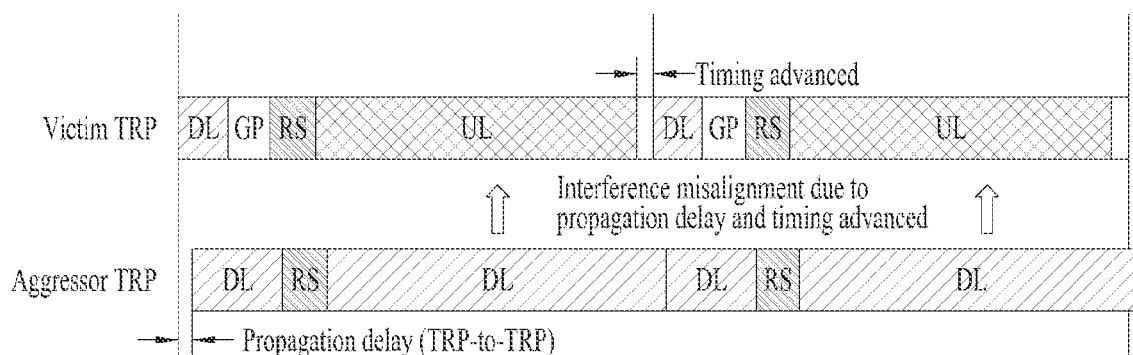
FIG. 16 is a diagram illustrating an example of a received signal and cross-link interference in a victim TRP (e.g., eNB).

FIG. 16 is a diagram illustrating an example of a received signal and cross-link interference in a victim TRP (e.g., eNB).

FIG. 16 illustrates interference caused by DL transmission of a neighbor TRP during UL reception of a TRP in a TDD-based self-contained frame structure. For convenience of description, it is assumed in FIG. 16 that an aggressor TRP and a victim TRP have the same numerology and the same frame structure. Cross-link interference in FIG. 16 may be illustrated as in, for example, FIG. 17 in terms of the UE.

Figure 17:
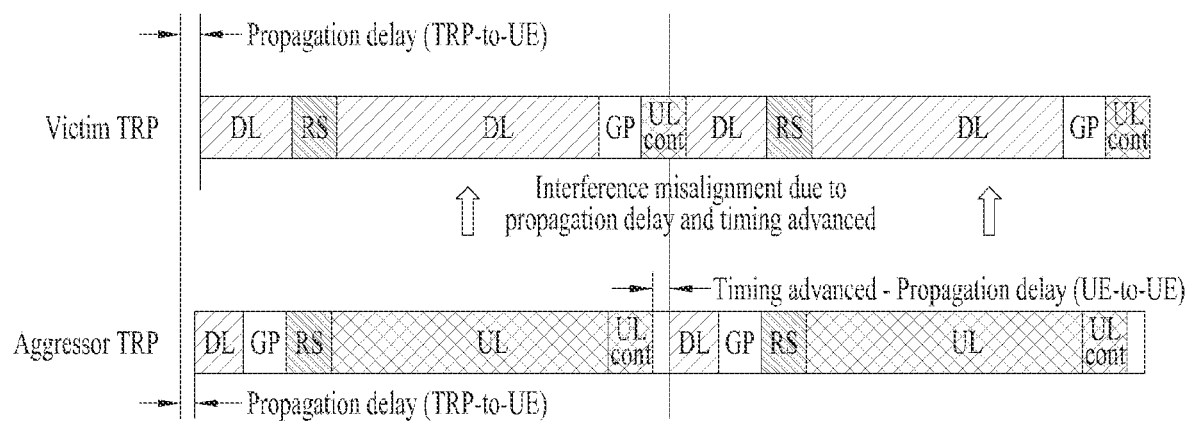
FIG. 17 is a diagram illustrating an example of a received signal and cross-link interference in a victim UE.

FIG. 17 is a diagram illustrating an example of a received signal and cross-link interference in a victim UE.

As illustrated in FIG. 17, there may be an RS added for a DL signal and an RS added for a UL signal. FIG. 17 illustrates an example in which the RS added for the DL signal and the RS added for the UL signal are located at the same position. Unlike the example of FIG. 17, the RS added for the DL signal and the RS added for the UL signal may be located at different positions.

When a specific TRP changes a DL/UL configuration for flexible duplex, cross-link interference occurs and UL reception performance of the TRP or DL reception performance of the UE may be degraded due to additional interference. Accordingly, a receiver capable of suppressing or cancelling cross-link interference is needed. However, it is necessary to estimate orthogonality (channel gain) caused by cross-link interference in order to operate the receiver. To this end, detailed proposals are given as described below.

Proposal 1

The RS may be used to estimate orthogonality of a cross-link interference signal or acquire interference information from a neighbor aggressor TRP/UE.

To suppress or cancel cross-link interference, it is necessary to estimate a channel of cross-link interference. From the viewpoint of reception of a victim TRP, cross-link interference may occur during UL reception from the aggressor TRP. From the viewpoint of reception of a victim UE, cross-link interference may occur during DL reception from the aggressor UE. Therefore, a usage range of the RS may vary according to a UL frame structure and a DL frame structure.

In cellular communication, a DM-RS has already been present for the following purposes.

DM-RS for DL: RS for demodulation of a DL control signal and a DL data signal

DM-RS for UL: RS for demodulation of a UL control signal and a UL data signal

Current 5G new RAT (NR) considers that an RS for DL and an RS for UL are commonly designed. However, since the DL RS and the UL RS may or may not be commonly designed, each of the two cases will be described hereinbelow.

Proposal 1-1

As a detailed proposal of Proposal 1, when the DL RS and the UL RS have common design (i.e., time and frequency locations are equal), DL and UL may be distinguished using different frequency resources, different time resources, or different code resources.

Figure 18:
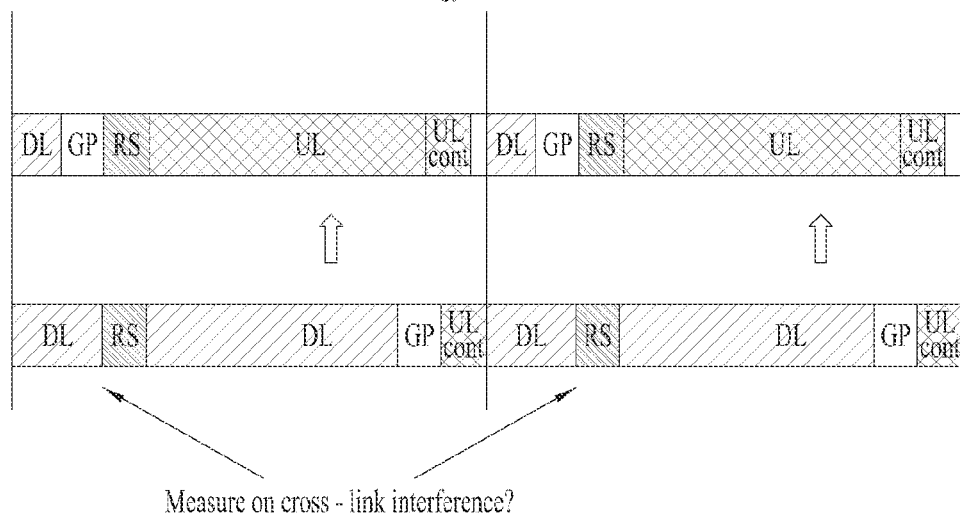
FIG. 18 is a diagram illustrating an example when a DL RS and a UL RS have common design.

FIG. 18 is a diagram illustrating an example when a DL RS and a UL RS have common design.

When the DL RS and UL RS have common design, frequency and time locations of the DL RS and the UL RS may be equal. In this situation, the DL RS and the UL RS may be distinguished by making the DL RS and the UL RS orthogonal through allocation of a resource such as a frequency resource, a time resource, or a code resource. Embodiment 1 described below is an embodiment capable of obtaining orthogonality between the DL RS and the UL RS using the frequency resource, the time resource, or the code resource.

Figure 19:
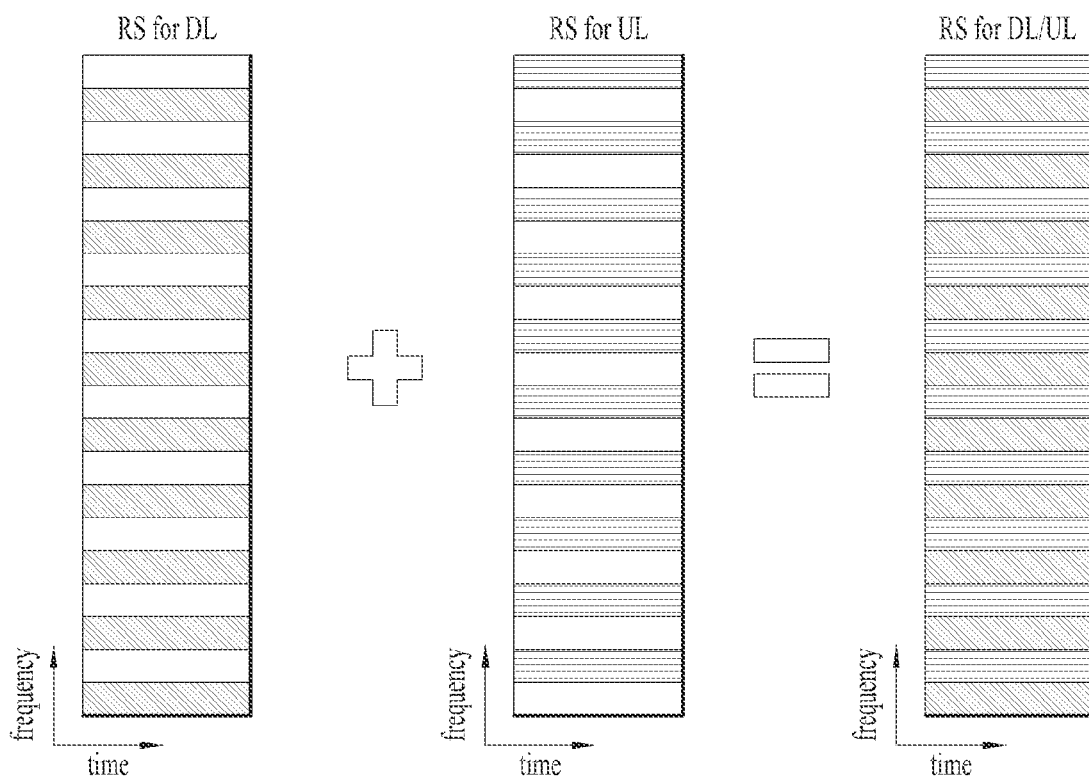
FIG. 19 is a diagram illustrating an example of allocating different frequency resources to a DL RS and a UL RS, for cross-link interference measurement.

FIG. 19 is a diagram illustrating an example of allocating different frequency resources to a DL RS and a UL RS, for cross-link interference measurement.

As a detailed embodiment of Embodiment 1, Embodiment 1-1 is an embodiment capable of obtaining orthogonality between the DL RS and the UL RS using different frequency resources as in FDM. As described in the following embodiment, different frequency or physical resources are used for the DL RS and the UL RS so that orthogonality between the DL RS and the UL RS may be maintained and distinguished. In the following embodiment, the DL RS is non-continuously configured and the UL RS is non-continuously configured using frequency or physical resources which are not used for the DL RS. However, any combination using different frequency or physical resources may be used without being limited to a combination of the embodiment.

Figure 20:
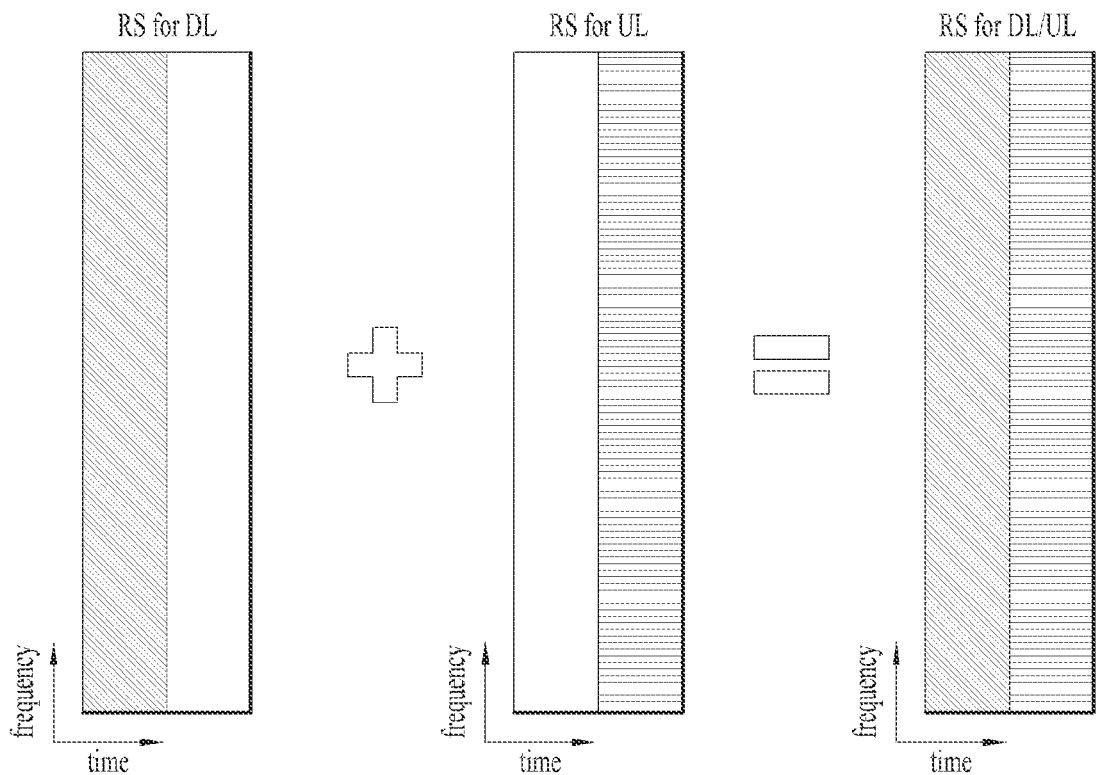
FIG. 20 is a diagram illustrating an example of doubling a base subcarrier spacing and allocating different time resources to a DL RS and a UL RS, for cross-link interference measurement.

FIG. 20 is a diagram illustrating an example of doubling a base subcarrier spacing and allocating different time resources to a DL RS and a UL RS, for cross-link interference measurement.

FIG. 20 illustrates Embodiment 1-2, as a detailed embodiment of Embodiment 1, which may obtain orthogonality between the DL RS for DL and the UL RS using different time resources.

As in the embodiment of FIG. 20, the DL RS and the UL RS may use different time resources or different symbols so that orthogonality between the DL RS and the UL RS may be maintained and distinguished. In Embodiment 1-2, a subcarrier different from a subcarrier used for traditional data transmission (e.g., 30 kHz rather than 15 kHz) is used to reduce a symbol duration so that transmission may be performed using different time resources. A specific time resource or symbol is configured for the DL RS and a time resource or symbol not used for the DL RS is configured for the UL RS. However, any combination of different time resources or symbols using a symbol duration reduced by use of other subcarrier sizes may be used without being limited to a combination of the embodiment of FIG. 20.

Figure 21:
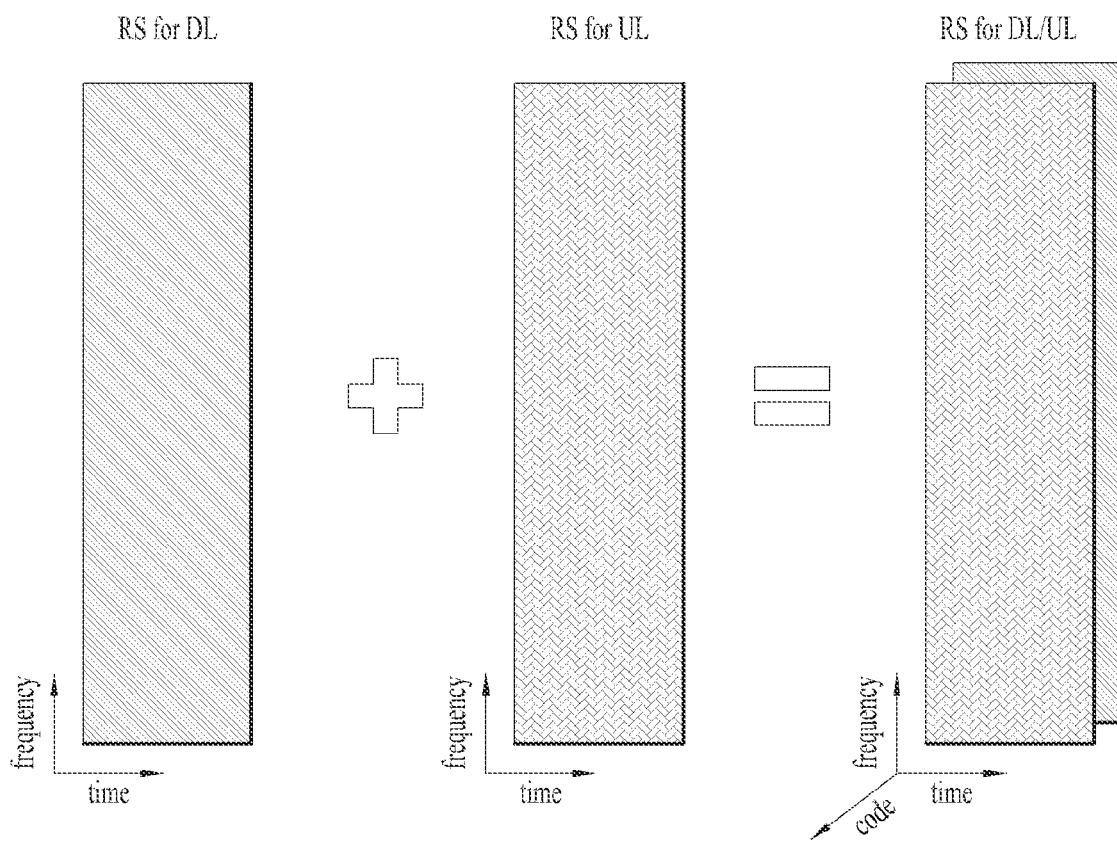
FIG. 21 is a diagram illustrating an example of allocating different code resources to a DL RS and a UL RS, for cross-link interference measurement.

FIG. 21 is a diagram illustrating an example of allocating different code resources to a DL RS and a UL RS, for cross-link interference measurement.

FIG. 21 illustrates Embodiment 1-3, as a detailed embodiment of Embodiment 1, which may obtain orthogonality between the DL RS and the UL RS using code resources.

As illustrated in Embodiment 1-3, the DL RS and the UL RS use different orthogonal codes so that orthogonality between the DL RS and the UL RS may be maintained and distinguished. In Embodiment 1-3, a specific code is configured for the DL RS a code orthogonal to the code used for the DL RS is configure for the UL RS. However, any combination using different orthogonal codes may be used without being limited to a combination of the embodiment.

Furthermore, any combination of Embodiment 1-1, Embodiment 1-2, and Embodiment 1-3 may be used. For example, a combination of Embodiment 1-1 and Embodiment 1-3 may be configured to use different frequency resources between groups of specific TRPs and use different codes within a group.

In Proposal 1, orthogonality between DL and UL should be considered during design of legacy RSs and orthogonality corresponding to the number of TRPs should be guaranteed if cross-link interference from a plurality of TRPs needs to be measured. In this case, due to change in the legacy RSs, legacy MIMO multi-port transmission may be limited. Therefore, in consideration of disadvantages of the above proposed method, another approach is needed.

For orthogonality, it is necessary to exchange information about the DL RS and the UL RS between TRPs. For interference cancellation and channel estimation in a victim TRP, a DL RS of an aggressor TRP and a UL RS of the victim TRP should be orthogonal. Therefore, the victim TRP may exchange RS information with the aggressor TRP or transmit RS information to be used so that the aggressor TRP may select an orthogonal resource. In the case of UE-to-UE interference, orthogonality is needed between DL of the victim TRP and UL of the aggressor TRP. In this case, since each UE may have different aggressor TRP UL UEs, the UE may select an RS resource of DL based on information about aggressor UEs of each UE. In this case, DL RSs distinguished between UEs may be used. A scheme in which each UE detects aggressor UEs includes a procedure of performing measurement using an RACH and a sounding reference signal (SRS) with respect to all UEs and then performing reporting or performing estimation based on locations of the UEs, grouping the UEs, and performing measurement upon the grouped UEs.

In summary, more characteristically, an RS used in DL of the aggressor TRP may be differently configured according to a victim RS set. From the viewpoint of the UE, this means that RSs may be differently configured or used on a DL resource of the aggressor TRP and a DL resource of the victim TRP. This may be dynamically indicated or may be semi-statically configured. In addition, an RS resource used in UL of an aggressor TRP may be similarly changed according to situation.

Proposal 1-2

Figure 22:
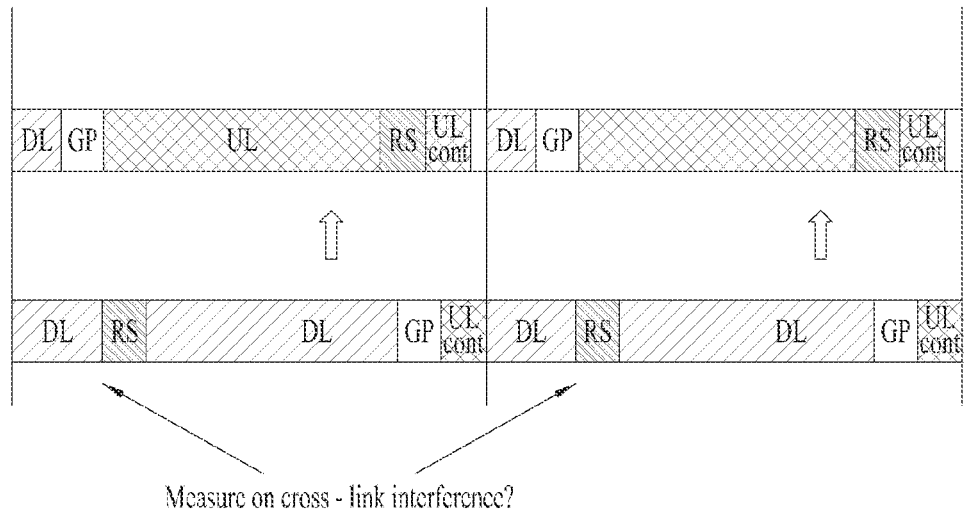
FIG. 22 is a diagram illustrating an example when a DL RS and a UL RS do not have common design.

FIG. 22 is a diagram illustrating an example when a DL RS and a UL RS do not have common design.

When the DL RS and the UL RS do not have common design (i.e., when time and frequency locations are different), if a resource region corresponding to a data signal which is subjected to interference is configured as an interference measurement resource (IMR), a victim TRP may identify a DL signal of a neighbor aggressor TRP and a victim UE may identify a UL signal of a neighbor aggressor UE.

When symbol or frequency locations of the DL RS and UL RS are different, Embodiment 1-3 of Proposal 1-1 cannot be applied. Therefore, the following detailed embodiments may be implemented.

As Embodiment 1-4, a resource corresponding to a data region of UL may be configured as the IMR to estimate a channel of cross-link interference from a neighbor aggressor TRP or predict the amount of interference.

Figure 23:
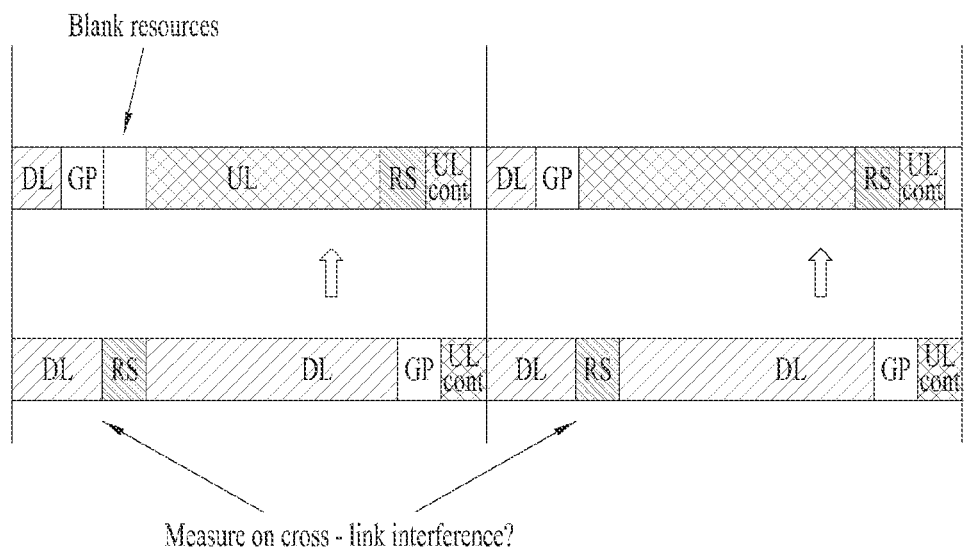
FIG. 23 is a diagram illustrating Embodiment 1-4 when a part of resources corresponding to a UL data region is configured as an IMR to acquire information about a cross-link interference signal of an aggressor TRP.

FIG. 23 is a diagram illustrating Embodiment 1-4 when a part of resources corresponding to a UL data region is configured as an IMR to acquire information about a cross-link interference signal of an aggressor TRP.

Since only a resource desired by a victim TRP may be configured as the IMR, the victim TRP may acquire information about a cross-link interference signal in consideration of efficiency of resources. If a UL transmission resource of a UE is configured as the IMR, the IMR may be rate-matched during UL transmission. In terms of the UE, the IMR may correspond to a reserved resource. Alternatively, the IMR may be configured using a guard period (GP). That is, the IMR may be configured on the first symbol switched from DL to UL. This may represent that a starting point during UL transmission is dynamically or statically changed. For example, if the starting point is statically changed, starting points or GP lengths in a specific subframe set or subframes may differ. Such a resource may be present between a PUSCH and an uplink control information (UCI) region. Although the IMR is desirably distributed in an entire band, the IMR may be transmitted in a subband if the IMR is used for the purpose of specific measurement. As another example, if an aggressor TRP performs DL transmission, transmission may be performed using an SRS resource of a victim TRP. A part of the SRS resource of the victim TRP may be configured as the IMR so that the SRS resource (between TRPs or cells) may not be used for transmission in the TRPs. In this case, the aggressor TRP may transmit an IMR RS in the form of an SRS.

In Embodiment 1-5, a resource corresponding to a DL data region may be configured as the IMR to estimate a channel of cross-link interference from a neighbor aggressor UL or predict the amount of interference.

Figure 24:
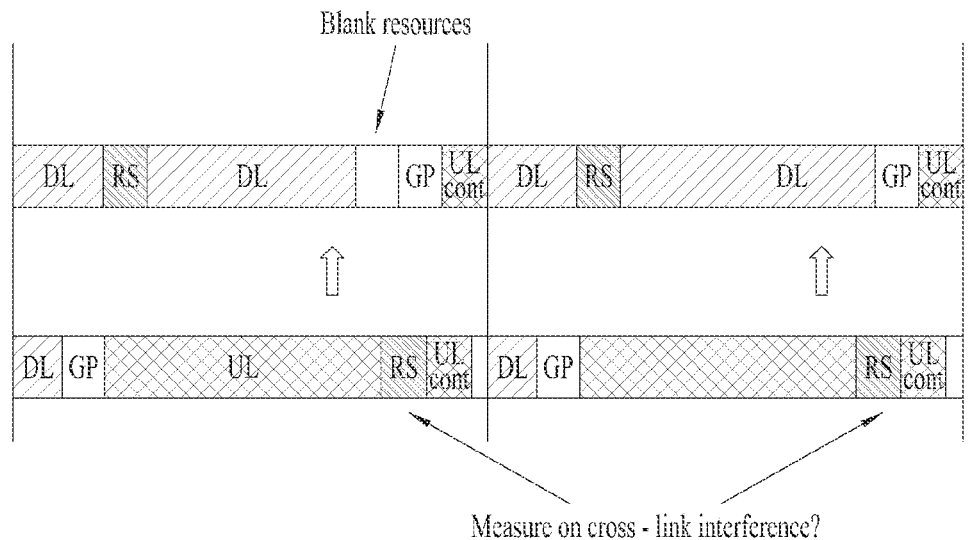
FIG. 24 is a diagram illustrating Embodiment 1-5 when a part of resources corresponding to a DL data region is configured as an IMR to acquire information about a cross-link interference signal of an aggressor UE.

FIG. 24 is a diagram illustrating Embodiment 1-5 when a part of resources corresponding to a DL data region is configured as an IMR to acquire information about a cross-link interference signal of an aggressor UE.

Since only a resource desired by a victim TRP may be configured as the IMR, the victim UE may acquire information about a cross-link interference signal in consideration of efficiency of resources. The IMR may be a resource for measurement in a UE. In this case, aggressor UEs may transmit an IMR RS in the form of a channel state information-RS (CSI-RS). The aggressor UEs may perform transmission using a part of the CSI-RS resource. Alternatively, the IMR may be configured on a transmission resource of a DM-RS or an SRS transmitted by the aggressor UEs. If the IMR is configured for a UE, the IMR may be configured separately from an IMR for DL-to-DL interference measurement. In addition, existing resources may be aligned such that each TRP may perform interference transmission on the IMR. As an example, configuration of the IMR may be limited by aligning resources for SRS transmission in one symbol. Alternatively, the IMR may be configured with respect to each TRP. One or more IMRs and subframe sets to which the IMRs are applied may be separately configured so that limited measurement may be performed during measurement of a received signal strength indicator (RSSI) or measurement of a CQI caused by interference.

A measurement value based on the IMR may be transmitted in the form of RSSI or may be used as an interference value during CQI calculation. Therefore, different CQI restricted measurement sets may be used to differently configure DL-to-DL interference and DL-to-UL interference for CQI calculation.

Proposal 2

If the DL RS and the UL RS have common design, a specific resource of a victim TRP/UE and/or an aggressor TRP/UE may be blanked (or punctured) and then may be configured as the IMR in order to acquire interference information from a neighbor aggressor TRP/UE.

To acquire the interference information from the neighbor aggressor TRP/UE, a specific resource of the victim TRP/UE and/or a specific resource of the aggressor TRP may be blanked (or punctured) and then may be configured as the IMR. Therefore, the victim TRP/UE may perform energy measurement upon cross-link interference from the aggressor TRP/UE, received on a specific resource corresponding to a data region, without additional signal design and separately measure cross-link interference from a plurality of aggressor TRPs, generated on a corresponding resource, according to each aggressor TRP. To this end, the following detailed embodiments may be performed.

In consideration of an analog beam, cross-link interference may be measured per beam with respect to SRSs transmitted through multiple beams and then reported or may be measured at the best interference level for multiple SRS beams while fixing a receiver beam of a UE. For this purpose, one IMR may be configured with respect to multiple beams. After interference for each symbol is measured, the greatest values are averaged. Alternatively, interference values may be simply averaged or some best values (with respect to multiple beams) may be selectively averaged. Alternatively, a subset of beams to be measured during interference measurement may be configured. This may be adjusted by limiting or explicitly configuring the number of symbols to be measured during configuration of the IMR. In addition, information about a beam generating maximum interference may be reported by transmitting information about a corresponding beam or information about a corresponding symbol.

As an embodiment of Proposal 2, Embodiment 2-1 may configure the IMR by blanking (or puncturing) a specific resource corresponding to data of a victim TRP for the purpose of estimating orthogonality of a cross-link interference signal or acquiring interference information from a neighbor aggressor TRP.

Figure 25:
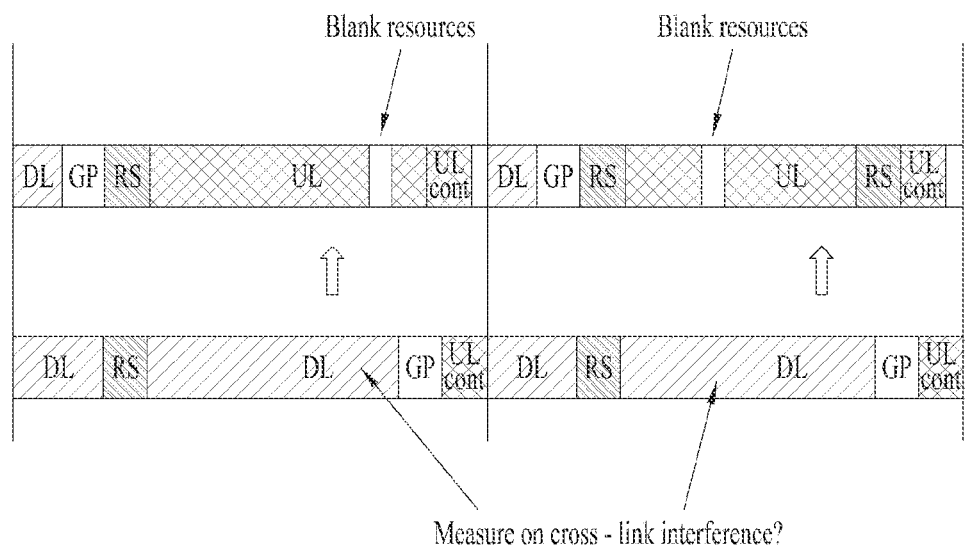
FIG. 25 is a diagram illustrating an example of considering information collection of an aggressor TRP by blanking (or puncturing) a specific resource of a victim TRP/UE to acquire information about a cross-link interference signal.

FIG. 25 is a diagram illustrating an example of considering information collection of an aggressor TRP by blanking (or puncturing) a specific resource of a victim TRP/UE to acquire information about a cross-link interference signal.

As in Embodiment 2-1 of FIG. 25, a specific resource of a victim TRP which is blanked (or punctured) differs according to a subframe or a slot. As in Embodiment 2-1, an order of blanked (or punctured) symbols may differ and different subcarriers may be blanked (or punctured) in consideration of a frequency selective characteristic.

Figure 26:
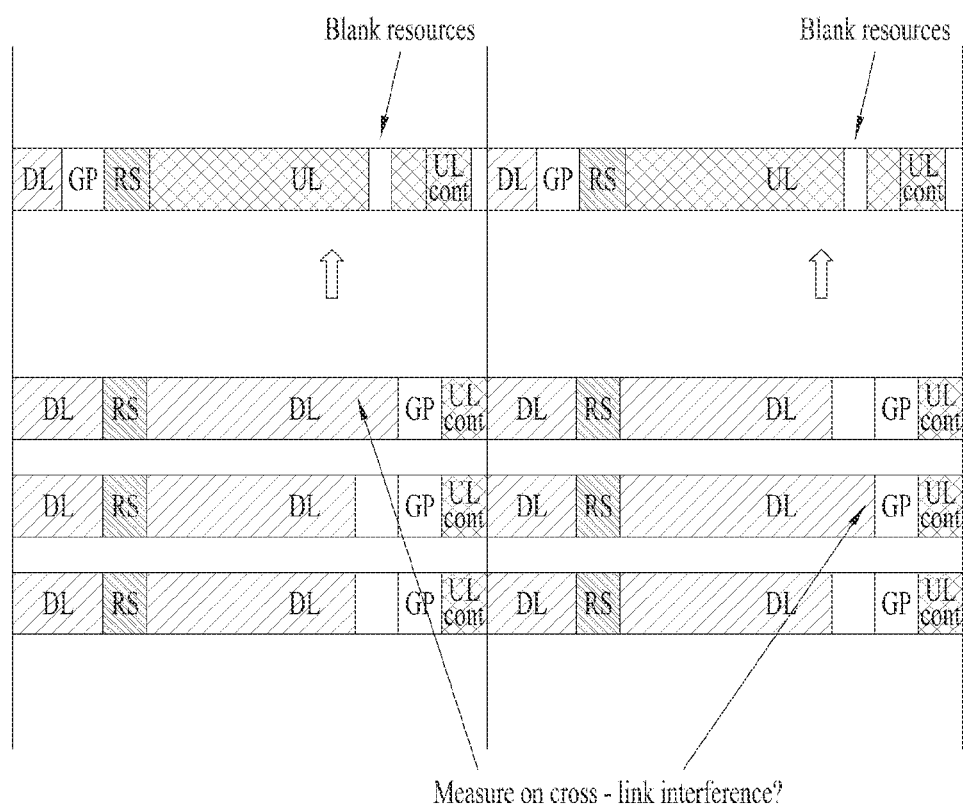
FIG. 26 is a diagram illustrating an example of considering information collection of an aggressor TRP by blanking (or puncturing) a specific resource of a victim TRP/UE and a specific resource of a specific aggressor TRP to acquire information about a cross-link interference signal.

FIG. 26 is a diagram illustrating an example of considering information collection of an aggressor TRP by blanking (or puncturing) a specific resource of a victim TRP/UE and a specific resource of a specific aggressor TRP to acquire information about a cross-link interference signal.

Embodiment 2-2 of FIG. 26 proposes blanking (or puncturing) a specific resource of a specific aggressor TRP among a plurality of aggressor TRPs for the purpose of estimating orthogonality of a cross-link interference signal from a neighbor aggressor TRP or acquiring interference information.

As in Embodiment 2-2, a specific resource of an aggressor TRP, which is blanked (or punctured), differs according to a subframe or a slot in order to distinguish between aggressor TRPs. If the number of blanked (or punctured) resources of an aggressor TRP is small, the victim TRP may estimate information about a cross-link interference signal of the aggressor TRP based on a combination of information accumulated with respect to a plurality of subframes or slots.

As in Embodiment 2-1, an order of blanked (or punctured) symbols may differ even in Embodiment 2-2 and different subcarriers may be blanked (or punctured) in consideration of a frequency selective characteristic.

In Embodiment 2-1 and Embodiment 2-2, a resource of a specific aggressor TRP, which is blanked (or punctured), may be replaced with time and frequency as in Proposal 1. Furthermore, a resource of a victim TRP may be blanked (or punctured) by any combination of time and frequency resources.

Figure 27:
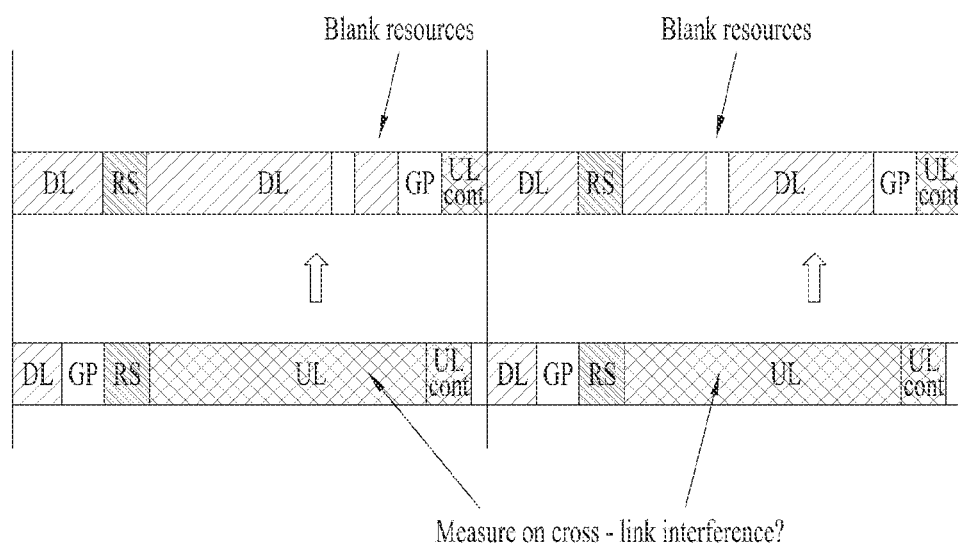
FIG. 27 is a diagram illustrating an example of considering information collection of an aggressor UE by blanking (or puncturing) a specific resource of a victim UE to acquire information about a cross-link interference signal.

FIG. 27 is a diagram illustrating an example of considering information collection of an aggressor UE by blanking (or puncturing) a specific resource of a victim UE to acquire information about a cross-link interference signal.

Embodiment 2-3 of FIG. 27 may configure the IMR by blanking (or puncturing) a specific resource corresponding to data of a victim UE in order for a victim TRP to estimate orthogonality of a cross-link interference signal UE or acquire interference information from a neighbor aggressor UE.

As in Embodiment 2-1, a specific resource of the victim UE, which is blanked (or punctured), differs according to a subframe or a slot. As in the above embodiment, an order of blanked (or punctured) symbols may differ and different subcarriers may be blanked (or punctured) in consideration of a frequency selective characteristic.

Figure 28:
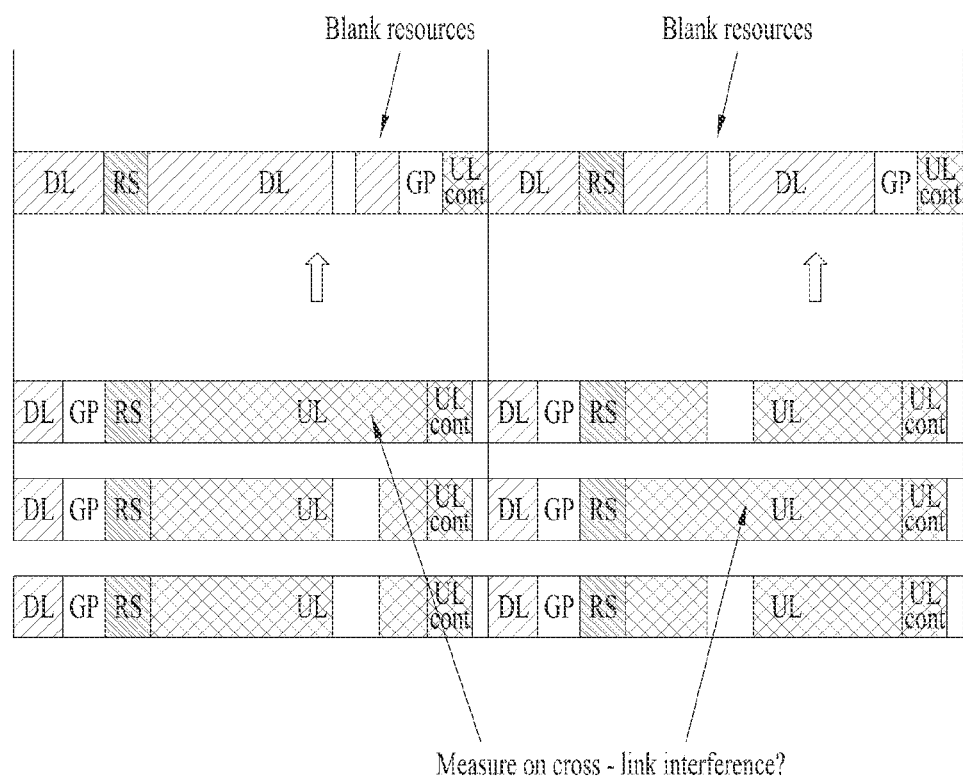
FIG. 28 is a diagram illustrating an example of considering information collection of an aggressor UE by blanking (or puncturing) of a specific resource of a victim UE and a specific resource of a specific aggressor UE to acquire information about a cross-link interference signal.

FIG. 28 is a diagram illustrating an example of considering information collection of an aggressor UE by blanking (or puncturing) of a specific resource of a victim UE and a specific resource of a specific aggressor UE to acquire information about a cross-link interference signal.

Embodiment 2-4 of FIG. 28 proposes blanking (or puncturing) a specific resource of a specific aggressor UE among a plurality of aggressor UEs in order for a victim TRP to estimate orthogonality of a cross-link interference signal or acquire interference information from a neighbor aggressor UE.

As in Embodiment 2-4, a specific resource of an aggressor TRP, which is blanked (or punctured), differs according to a subframe or a slot in order for the victim TRP to distinguish between aggressor UEs. If the number of blanked (or punctured) resources of the aggressor UE is small, the victim TRP may estimate information about a cross-link interference signal of the aggressor UE based on a combination of information accumulated with respect to a plurality of subframes or slots.

As in Embodiment 2-3, an order of blanked (or punctured) symbols may differ even in Embodiment 2-4 and different subcarriers may be blanked (or punctured) in consideration of a frequency selective characteristic.

In Embodiment 2-3 and Embodiment 2-4, a resource of a specific aggressor UE, which is blanked (or punctured), may be replaced with time and frequency as in Proposal 1. Furthermore, a resource of a victim UE may be blanked (or punctured) by any combination of time and frequency resources.

Proposal 3

For the purpose of estimating channel gain of a cross-link interference signal or acquiring interference information from a neighbor aggressor TRP/UE, rate matching may be performed to blank (or puncture) a specific resource of a victim TRP/UE and/or an aggressor TRP/UE.

Proposal 2 described above includes blanking (or puncturing) a specific resource (a resource for data transmission in the above embodiment (e.g., a PDSCH or a PUSCH may be used in LTE-(A)). To this end, a TRP transmitting a specific DL or a UE transmitting a specific UL may puncture a resource which may be needed to estimate channel gain of a cross-link interference signal acquire interference information from a neighbor aggressor TRP by performing rate matching.

Proposal 4

A victim TRP/UE may estimate channel gain of a cross-link interference signal from a neighbor aggressor TRP/UE. Alternatively, the victim TRP/UE may allocate or use a specific resource of the aggressor TRP/UE as an RS in order to acquire interference information.

A specific resource of the victim TRP/UE may be configured as a blank (or puncturing) resource in order for the victim TRP/UE to estimate channel gain of the cross-link interference signal or acquire the interference information from the neighbor aggressor TRP/UE. A specific resource of the aggressor TRP/UE may be configured as the RS. Therefore, the victim TRP/UE may measure, through the RS, cross-link interference through the RS received on a corresponding resource from the aggressor TRP/UE and separately measure, through orthogonality between RSs, cross-link interference from a plurality of TRPs/UEs generated on the corresponding resource. For this purpose, detailed embodiments described below may be performed.

Figure 29:
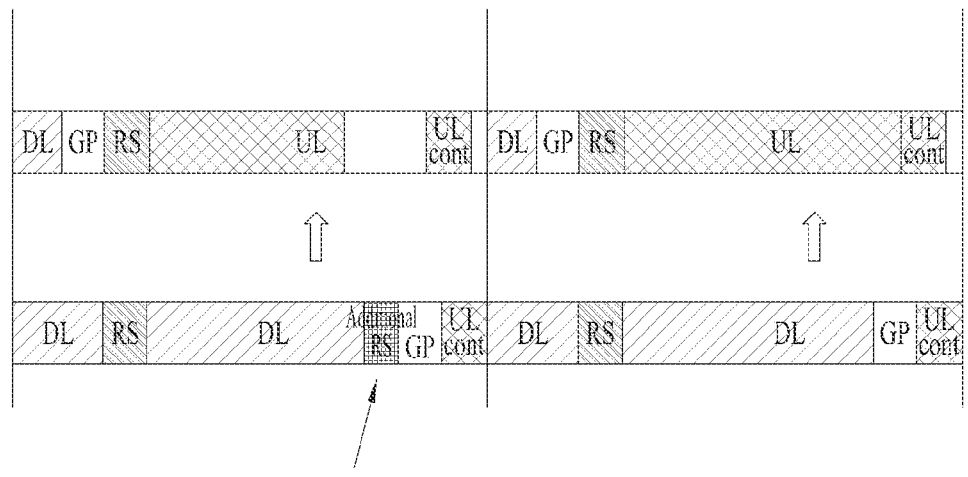
FIG. 29 is a diagram illustrating an example of considering information collection of an aggressor TRP by blanking (or puncturing) a specific resource of a victim TRP and configuring a specific resource of the aggressor TRP as an additional RA to acquire information about a cross-link interference signal.

FIG. 29 is a diagram illustrating an example of considering information collection of an aggressor TRP by blanking (or puncturing) a specific resource of a victim TRP and configuring a specific resource of the aggressor TRP as an additional RA to acquire information about a cross-link interference signal.

In Embodiment 4-1 of FIG. 29 as an embodiment of Proposal 4, an RS may be transmitted on a specific resource of a specific aggressor TRP among a plurality of aggressor TRPs in order for the victim TRP/UE to estimate channel gain of a cross-link interference signal or acquire interference information from a neighbor aggressor TRP.

Figure 30:
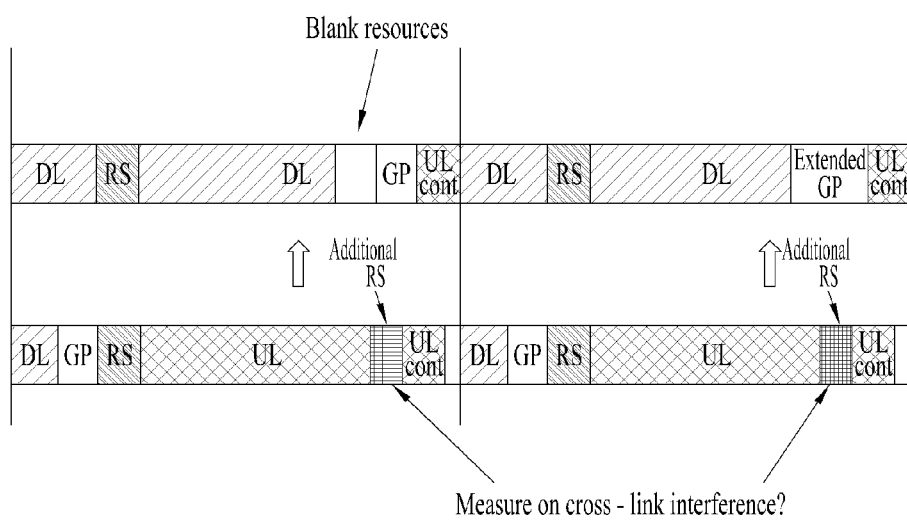
FIG. 30 is a diagram illustrating an example of considering information collection of the aggressor UE by blanking (or puncturing) a specific resource of a victim UE or extending a GP and configuring a specific resource of the aggressor UE as an additional RS to acquire information about a cross-link interference signal.

FIG. 30 is a diagram illustrating an example of considering information collection of the aggressor UE by blanking (or puncturing) a specific resource of a victim UE or extending a GP and configuring a specific resource of the aggressor UE as an additional RS to acquire information about a cross-link interference signal.

In Embodiment 4-2 of FIG. 30, an RS may be transmitted on a specific resource of a specific aggressor UE among a plurality of aggressor UEs in order for the victim TRP to estimate channel gain of a cross-link interference signal or acquire interference information from a neighbor aggressor UE. In addition, in order for the victim UE to receive an additional RS, it is necessary to blank a corresponding resource. If the location of the additional RS overlaps with a GP of the victim UE, the victim UE may achieve the purpose of receiving the additional RS by extending the GP without blanking the corresponding resource.

In this case, the victim TRP/UE may configure a resource to be blanked (or punctured) as the IMR so that a user to which a corresponding resource is allocated may not use the corresponding resource. To distinguish between additional RSs of a specific aggressor TRP/UE of Embodiment 2-1, Embodiment 2-2, Embodiment 2-3, and Embodiment 2-4, time, frequency, and code may be used as in Proposal 1. A resource used by the victim TRP/UE may be blanked (or punctured) by any combination of time and frequency resources.

Proposal 5

For the purpose of estimating channel gain of a cross-link interference signal or acquiring information about the interference signal from a neighbor aggressor TRP, a victim TRP/UE may use backhaul signaling to secure orthogonality between a DL RS and a UL RS or exchange information about locations of the RSs for obtaining information about a cross-link interference signal.

For the purpose of estimating channel gain of a cross-link interference signal or acquiring information about the interference signal, backhaul signaling may be used to secure orthogonality between the DL RS and the UL RS through Proposal 1, blank (or puncture) a specific resource through Proposal 2, or exchange corresponding information (e.g., the location of a resource or an index of a table indicating the location of the resource) when a specific resource is transmitted as an RS through Proposal 4.

In blanking (or puncturing) a resource in Proposal 2, if the location of a previously blanked (or punctured) resource is connected to a guard time, implicit transmission may be performed through information about the changed guard time.

Proposal 6

Figure 31:
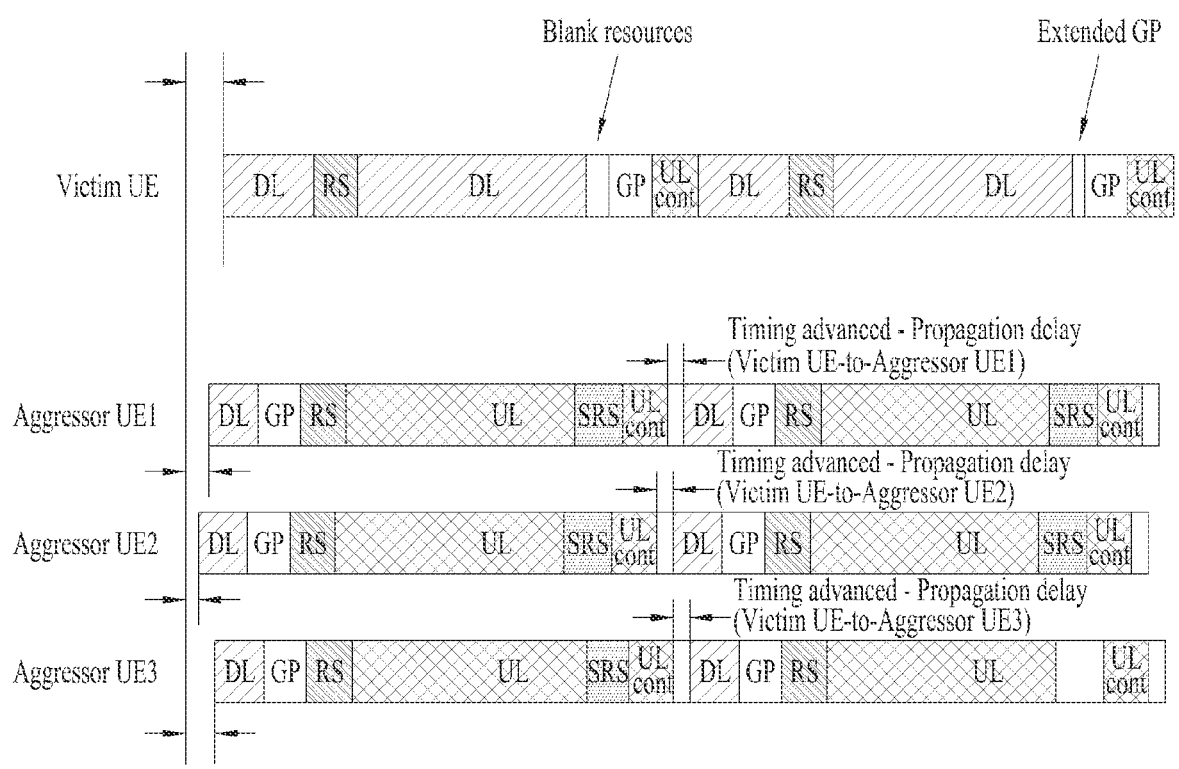
FIG. 31 is a diagram illustrating an example of collecting information of an aggressor UE by blanking (or puncturing) a specific resource of a victim UE and using a specific resource (SRS) of the aggressor UE to acquire information about a cross-link interference signal.

FIG. 31 is a diagram illustrating an example of collecting information of an aggressor UE by blanking (or puncturing) a specific resource of a victim UE and using a specific resource (SRS) of the aggressor UE to acquire information about a cross-link interference signal.

During UL transmission of a UE, the UE transmits a signal (e.g., SRS) used to estimate UL channel gain to a TRP. An aggressor UE may transmit the SRS for UE-to-UE cross-link interference measurement and a victim UE may use the SRS transmitted by the neighbor aggressor UE for cross-link interference measurement.

For UL channel gain measurement, there may be an SRS transmitted to a TRP from a specific UE. Whether the SRS has been transmitted may be signaled through SIB2, RRC connected setup, or RRC connected reconfiguration to the UE by a scheduler of a determined TRP. For UE-to-UE cross-link interference measurement, even a victim UE needs to configure a resource corresponding to an SRS transmission location (or location of an SRS transmission resource) of an aggressor TRP as the IMR or extend the GP as described in relation to Embodiment 4-2. In addition, if there is a considerable difference in propagation delay according to location or there is timing misalignment, a UE may configure a corresponding resource as a blank resource without performing SRS transmission of the aggressor TRP. To identify an SRS of a specific aggressor UE, time, frequency, and codes may be used as in Proposal 1. A resource of the victim UE may be blanked (or punctured) by any combination of time and frequency resources.

The above-described method is used for cross-link interference measurement after a victim TRP/UE and an aggressor TRP/UE are determined. However, information about cross-link interference measured through the above-described method may be used later when a TRP/UE determines a DL/UL transmission direction. More specifically, if a TRP/UE that may affect cross-link interference or may be affected by cross-link interference changes a DL/UL transmission direction from an existing transmission direction to another direction, since candidates of the victim TRP/UE and the aggressor TRP/UE may be determined according to change of direction, whether a transmission direction is changed may be determined based on previous information which may relate to cross-link interference. The previous information which may relate to cross-link interference may include information about an RSSI value of cross-link interference previously measured in order to determine whether to change a transmission direction, scheduling information including DL/UL configuration, power control, and an MCS level, which may be exchanged between TRPs (e.g., using an X2 interface), and/or interference attenuation information based on geometry information between TRPs. With regard to the information related to cross-link interference, the following detailed proposals may be given.

Proposal 7

Information about previously measured cross-link interference may be transmitted as information considered to determine whether to change a transmission direction from DL to UL or from UL to DL or when a transmission direction is changed or may be used to determine an MCS and a power level which are to be used during scheduling for a UE. As an example, the information may be used for a UE having severe interference during DL transmission from an intended UL at a low MCS and high power. If a network can use full duplex, the information may be used to determine a DL or UL direction of each UE. If an IMR is configured for victim UEs, the information may be used to raise power in a high interference situation. If interference is reflected in a CQI, such usage may be scheduled according to the CQI. If an analog beam is considered, the information may be transmitted during analog beam transmission to a corresponding UE according to an intended DL/UL. That is, if a UE has a high RSSI or UE-to-UE interference, the UE may transmit the information according to the intended DL/UL and, if not, the UE may more dynamically determine DL/UL.

Proposal 7-1

If an RSSI value of cross-link interference from an aggressor TRP, measured by a victim TRP, is above a specific threshold, the victim TRP may transmit, to the aggressor TRP through an X2 interface, a message of restricting change of direction from UL to DL or from DL to UL and/or information to be used to determine a direction from UL to DL or to be used at a timing when a direction is changed from DL to UL.

As an example, when a direction of a specific TRP is UL in the case in which a baseline DL/UL configuration of the network is UL, if a direction of a neighbor TRP is changed from UL to DL, the TRP that has changed a direction becomes an aggressor TRP and the other TRPs conforming to the baseline DL/UL configuration become victim TRPs. In this case, the victim TRP may measure cross-link interference from the aggressor TRP based on the above proposals and transmit information about measured value(s) (e.g., an RSSI value of cross-link interference from a specific aggressor TRP and/or an RSSI value of cross-link interference, aggregated from multiple aggressor TRPs) to one or plural aggressor TRPs through the X2 interface. After a predetermined time elapses, if a direction of the aggressor TRP is changed from UL to DL unlike the baseline DL/UL configuration, the aggressor TRP may determine whether to change a direction from UL to DL based on the information about the measured value(s).

As another example, when a direction of a specific TRP is DL in the case in which the baseline DL/UL configuration of the network is DL, if a direction of a neighbor TRP is changed from DL to UL, the TRP that has changed a direction becomes a victim TRP and the other TRPs conforming to the baseline DL/UL configuration become aggressor TRPs. In this case, the victim TRP may measure cross-link interference from the aggressor TRP based on the above proposals and store information about measured value(s) (e.g., an RSSI value of cross-link interference from a specific aggressor TRP and/or an RSSI value of cross-link interference, aggregated from multiple aggressor TRPs). After a predetermined time elapses, if the victim TRP changes a direction from DL to UL unlike the baseline DL/UL configuration, the victim TRP may determine whether to change a direction from DL to UL based on the information about the measured value(s).

Proposal 7-2

If an RSSI value of cross-link interference from an aggressor UE, measured by a victim UE, is above a specific threshold, a message of restricting change of a direction from UL to DL or from DL to UL and/or information to be used to determine a direction from UL to DL or to be used at a timing when a direction is changed from DL to UL may be transmitted to a connected TRP (an aggressor TRP in terms of TRP-to-TRP cross-link interference) through UL transmission such as a PUCCH or a PUSCH.

As an example, when a direction of a specific TRP is DL in the case in which the baseline DL/UL configuration of the network is DL, if a direction of a neighbor TRP is changed from DL to UL, a UE connected to the TRP that has changed a direction becomes an aggressor UE and UEs connected to the other TRPs conforming to the baseline DL/UL configuration become victim UEs. In this case, the victim UE may measure cross-link interference from the aggressor UE based on the above proposals and transmit information about measured value(s) (e.g., an RSSI value of cross-link interference from a specific aggressor UE and an RSSI value of cross-link interference, aggregated from multiple aggressor UEs) to a connected TRP through UL transmission such as the PUCCH or the PUSCH and to one or plural neighbor TRPs through the X2 interface.

After a predetermined time elapses, if the connected TRP changes a direction from DL to UL unlike the baseline DL/UL configuration, the victim UE may cause the TRP to determine whether to change a direction from DL to UL based on the information about the measured value(s).

As another example, when a direction of a specific TRY is UL in the case in which the baseline DL/UL configuration of the network is UL, if a direction of a neighbor TRP is changed from UL to DL, a UE connected to the TRP that has changed a direction becomes a victim UE and UEs connected to the other TRPs conforming to the baseline DL/UL configuration become aggressor UEs. In this case, the victim UE may measure cross-link interference from the aggressor UE based on the above proposals and transmit information about measured value(s) (e.g., an RSSI value of cross-link interference from a specific aggressor UE and/or an RSSI value of cross-link interference, aggregated from multiple aggressor UEs) to a connected TRP through UL transmission such as the PUCCH or the PUSCH and to one or plural neighbor TRPs through the X2 interface. After a predetermined time elapses, if the connected TRP changes a direction from UL to DL unlike the baseline DL/UL configuration, the victim UE may cause the TRP to determine whether to change a direction from UL to DL based on the information about the measured value(s).

Proposal 8

Scheduling information, including DL/UL configuration, power control, and an MCS level, which may be exchanged between TRPs (e.g., using an X2 interface), and geometry information between TRPs may be transmitted as information considered to determine whether to change a transmission direction from DL to UL or from UL to DL or considered when a transmission direction is changed.

Features of cross-link interference may be determined by a DL/UL transmission direction of a neighbor TRP. That is, the features of cross-link interference may be determined by the location of an aggressor TRP that has changed a transmission direction and by power control. In other words, as the distance between the aggressor TRP and a victim TRP increases, the amount of cross-link interference is reduced and, conversely, if the distance between the aggressor TRP and the victim TRP decreases, the amount of interference increases. The transmission power of the aggressor TRP and the amount of cross-link interference are directionally proportional to each other. During reception of the victim TRP, an impact of cross-link interference that a receiver experiences due to an MCS level may be changed. Therefore, the above-described scheduling information including DL/UL configuration, power control, and the MCS level may be used to estimate the amount of cross-link interference or an impact of interference at the receiver and may be used as information considered to determine whether to change a transmission direction from DL to UL or from UL to DL or when a transmission direction is changed.

In addition, a combination of information of Proposal 7 and Proposal 8 may be used as the information considered to determine whether to change a transmission direction from DL to UL or from UL to DL or considered when a transmission direction is changed.

Proposal 9

Fallback may be performed when or after a transmission direction of a TRP is changed.

The amount of cross-link interference and an impact of cross-link interference may be estimated based on information about an RSSI value of previously measured cross-link interference, scheduling information, including DL/UL configuration, power control, and an MCS level, which may be exchanged between TRPs (e.g., using an X2 interface), and/or geometry information between TRPs. Whether to change a transmission direction of a TRP may be determined based on the above information. When the transmission direction of the TRP is changed, if the amount of cross-link interference after the above information is received exceeds a threshold or signaling indicating a complaint type of a victim TRP/UE is received due to an impact of interference, the changed transmission direction may fall back to the baseline DL/UL configuration.

Hereinbelow, a method of indicating and reporting IMR configuration information for UE-to-UE measurement to the UE will be described.

Proposal 10

The eNB may inform the UE of IMR configuration information determined for UE-to-UE measurement through predefined signaling.

To measure an RSSI of cross-link interference, the UE may be previously aware of the IMR configuration information. The IMR configuration information includes information for identifying the location of the IMR. For example, the IMR configuration information may include information about the period of the IMR, information about the location or offset of a time region (e.g., a slot or a subframe) in which the IMR is located, information about the location or offset of a symbol in which the IMR is located, and/or information about the location or offset of a frequency in which the IMR is located. The eNB may inform the UE of predefined IMR configuration information through predefined signaling so that the UE may be aware of the IMR configuration information. An IMR configuration may be a cell-specific, group-specific, and/or UE-specific configuration. If the IMR configuration is the group-specific configuration, the group-specific configuration represents grouping of multiple UEs which may be a set of UEs in the same serving cell or a set of UEs in different cells. A method of grouping UEs may include grouping based on the locations of UEs and/or on a channel between UEs.

Proposal 10-1

Predefined signaling for the IMR configuration information determined for UE-to-UE measurement may be radio resource control signaling.

The eNB may transmit cell-specific, group-specific, or UE-specific IMR configuration information to the UE through RRC signaling. To inform the UE of the IMR configuration information, the IMR configuration information may include a UE ID, a group ID, or a cell ID.

Proposal 10-2

Predefined signaling for the IMR configuration information determined for UE-to-UE measurement may be dynamically transmitted downlink control information (DCI).

The eNB may signal the cell-specific, group-specific, or UE-specific IMR configuration information to the UE through the DCI. This means that the eNB explicitly informs any UE which resource is the IMR. To inform the UE of the IMR configuration information, the eNB may transmit the UE ID, the group ID, or the cell ID in the IMR configuration information.

Proposal 10-3

Predefined signaling for the IMR configuration information determined for UE-to-UE measurement may be a dynamically transmitted group common PDCCH.

The eNB may broadcast the cell-specific, group-specific, or UE-specific IMR configuration information through the group common PDCCH. This means that the eNB explicitly informs UEs of any group which resource is the IMR.

Proposal 11

The eNB may indicate IMR validation and actual measurement, for UE-to-UE cross-link interference measurement, to the UE through the IMR configuration information.

The eNB may inform the UE of the location of the IMR as in Proposal 10. However, for power saving, the eNB may indicate whether IMR is valid or whether to perform measurement. This method is described below as detailed proposals.

Proposal 11-1 (Implicit Method)

As described in Proposal 10, the eNB may inform the UE of the IMR configuration information through predefined signaling. If a specific condition is satisfied, the eNB may cause the UE to be aware that the IMR configuration information is valid and to actually perform UE-to-UE cross-link interference measurement.

The UE is aware of the location of the IMR and may perform UE-to-UE cross-link interference measurement through the IMR. However, if all UEs perform UE-to-UE cross-link interference measurement every time on a plurality of IMRs, this may be unfavorable to the UEs. Therefore, in the specific condition (e.g., when a transmission direction of a serving cell is DL, when a transmission direction of a neighbor cell is UL, and/or an intended transmission direction is DL or UL) as in the above proposal, the eNB may cause the UE to be aware that the IMR configuration information is valid and to actually perform UE-to-UE cross-link interference measurement.

As an embodiment of Proposal 11, according to Embodiment 11-1, if a serving cell (or a serving eNB) signals information about transmission directions of neighbor cell(s) to the UE, this may cause the UE to implicitly recognize that a corresponding IMR configuration is valid and to actually perform UE-to-UE cross-link interference measurement, only when a transmission direction of a serving cell is DL and a transmission direction of a neighbor cell is UL.

In Embodiment 11-2, if the serving cell signals information about an intended transmission direction to the UE, this may cause the UE to implicitly recognize that a corresponding IMR configuration is valid and to actually perform UE-to-UE cross-link interference measurement, only when an intended DL/UL transmission direction is UL and a transmission direction of the serving cell is DL.

Proposal 11-2 (Explicit Method)

The eNB may inform the UE that presignaled IMR configuration information is valid through predefined signaling (e.g., existing or new DCI) and command the UE to perform measurement on a corresponding IMR.

The UE is aware of the location of the IMR and may perform UE-to-UE cross-link interference measurement through the IMR. However, if all UEs perform UE-to-UE cross-link interference measurement every time on a plurality of IMRs, this may be unfavorable to the UEs. Therefore, the eNB may cause the UE to be aware that corresponding IMR configuration information is valid and to actually perform UE-to-UE cross-link interference measurement, through predefined signaling. Herein, signaling for corresponding usage may additionally signal information about a time and/or frequency location at which the IMR configuration information is valid. That is, this means that the eNB may separately inform the UE of a valid IMR among a plurality of IMRs. The eNB may inform the UE of the above indication through a PDCCH or a PDSCH.

As an embodiment of Proposal 11-2, Embodiment 11-2-1 proposes adding a field indicating that the IMR in Proposal 10 is valid in existing DCI. The values of the field may be as follows.

0: This indicates that all IMRs for UE-to-UE cross-link interference measurement are invalid 1: This indicates that all IMRs for UE-to-UE cross-link interference measurement are valid and the UE should perform cross-link interference measurement and report a measured result Embodiment 11-2-2 proposes additionally including, in existing DCI, a field indicating that the IMR in Proposal 10 is valid, information about a valid time of the IMR configuration information, and/or information about a frequency location of the IMR. Related values may be as follows.

00: This indicates that all IMRs for UE-to-UE cross-link interference measurement are invalid 01: This indicates that IMRs for tier 1 UE-to-UE cross-link interference measurement are valid and the remaining IMRs are unavailable 10: This indicates that IMRs for tier 2 UE-to-UE cross-link interference measurement are valid and the remaining IMRs are unavailable 11: This indicates that all IMRs for UE-to-UE cross-link interference measurement are valid and the UE should measure cross-link interference and report a measured result In Embodiment 11-2-2, a distinction between tier 1 and tier 2 may be changed by a transmission direction of a neighbor cell and may be predetermined.

Proposal 12

For UE-to-UE cross-link interference measurement, cell-specific, group-specific, or UE-specific IMR configuration, ID information (a cell ID, a group ID, and/or a UE-ID), and/or numerology information may be exchanged between TRPs (e.g., using an X2 interface). To identify IMR configuration, the cell ID, the group ID, and/or the UE-ID as well as IMR configuration information may be included. Furthermore, numerology information may also be exchanged between corresponding cells. Only when numerology used in a neighbor cell is known, the accurate location of an IMR used in the neighbor cell may be used using information about the location or offset of a slot or a subframe in which the IMR is located, information about the location or offset of a symbol in which the IMR is located, or information about the location or offset of a frequency in which the IMR is located.

Proposal 13

For UE-to-UE cross-link interference measurement, DL/UL configuration information including a DL/UL transmission direction of a neighbor cell may be exchanged between TRPs (e.g., using an X2 interface).

Features of cross-link interference may be determined by a DL/UL transmission direction of a neighbor TRP. That is, it may be appreciated that the features of cross-link interference are determined by the location of an aggressor TRP that has changed a transmission direction and by power control. Therefore, the amount of UE-to-UE cross-link interference or an impact of interference at the UE may be predicted through information about the DL/UL transmission direction.

Proposal 14

The UE may periodically and/or aperiodically report information about UE-to-UE cross-link interference measured using an IMR to the eNB (or serving cell).

The UE may measure UE-to-UE cross-link interference using a determined or indicated valid IMR or on the valid IMR and report a measured cross-link interference value to the eNB. In this case, reporting may be performed using a periodic and/or aperiodic method.

Proposal 14-1 (Periodic Reporting)

The UE may report the measured cross-link interference value to the eNB only when the measured value is greater than a preset threshold or may always periodically report the measured value to the eNB regardless of whether the measured value is greater than the preset threshold.

The UE may periodically report the measured value to the eNB at given periods through a PUCCH or a PUSCH. However, in order to reduce power consumption of the UE, only when the measured value is greater than the preset threshold, the UE may report the measured value to the eNB at a corresponding period among the given periods and, otherwise, the UE may not perform reporting to the eNB. In this case, the UE may determine whether to transmit the measured value to the eNB. The UE may report a difference between a previously measured/reported value and the measured value to the eNB or report the measured value to the eNB.

Proposal 14-2 (Aperiodic Reporting)

The UE performs reporting to the eNB only when the measured cross-link interference value is greater than the preset threshold or when there is a preset threshold error as compared with a previously measured/reported value.

The UE may aperiodically report the measured value to the eNB by request based on event-trigger, without periodically reporting the measured value to the eNB through the PUCCH or the PUSCH. That is, only when the measured value is greater than the preset threshold, the UE may report the measured value to the eNB at a corresponding period among the given periods or when there is a preset threshold error as compared with a previously measured/reported value, the UE may report the measured value to the eNB by request.

Proposal 14-3

Upon performing transmission to the eNB, the UE may report information about M higher measurement values (or the highest or average value) together with linked IMR configuration indexes.

Although the UE may periodically or aperiodically report all cross-link interference measurement results to the eNB, the UE may report a specific subset. In this case, the UE may report information about M measurement values together with the IMR configuration indexes and the eNB may be implicitly aware of in which neighbor cell a UE generates interference.

Method of Informing the UE of SRS Information for UE-to-UE Measurement and Reporting the Same to the UE Proposal 15

For SRS transmission for UE-to-UE cross-link interference measurement, the eNB may configure a UE-specific SRS for the UE or may transmit UE-specific SRS configuration information, through predefined signaling.

The UE may receive configuration information for SRS transmission from the eNB (or serving cell) through a PDCCH or a PDSCH. The configuration information may be used for UE-to-UE cross-link interference measurement as well as for sounding for measurement. That is, a specific UE may not be aware of whether configured SRS transmission is used for sounding or UE-to-UE cross-link interference measurement. If a periodic SRS, an aperiodic SRS, or a semi-persistent SRS is configured for beam management, a UE of a neighbor eNB that has been aware of this information may perform UE-to-UE cross-link interference measurement of UEs located in a neighbor cell using the transmitted SRS.

Proposal 16

The eNB may inform the UE of group-specific or cell-specific SRS configuration information determined for UE-to-UE measurement through predefined signaling.

As described in Proposal 6 and Proposal 15, the aggressor UE may transmit the SRS for UE-to-UE measurement. However, when a transmission direction of the eNB (eNB may be represented as gNB in new RAT) is configured as UL, if numerous UEs belonging to a corresponding cell perform UL transmission for UE-to-UE cross-link interference measurement, an SRS resource may be wasted although accuracy of UE-to-UE cross-link interference measurement is high. Therefore, a cell-specific or group-specific SRS may be allocated for UE-to-UE cross-link interference measurement. Configuration information about the cell-specific or group-specific SRS may be broadcast by the eNB to all UEs belonging to a serving cell or UEs belonging to a specific group through a group-common PDCCH or PDSCH.

To measure an RSRP of cross-link interference, the UE may be previously aware of group-specific or cell-specific SRS configuration information. The group-specific or cell-specific SRS configuration information includes information for identifying the location of an SRS transmission resource and an SRS sequence. For example, the SRS configuration information may include at least one of information about the period of the SRS, information about the location or offset of a slot or a subframe in which the SRS is located, information about the location or offset of a symbol in which the SRS is located, the location of a subband in which the SRS is located, information about the location or offset of a frequency in which the IMR is located, or a sequence root number of the SRS. The eNB may inform the UE of predefined group-specific or cell-specific SRS configuration information through predefined signaling so that the UE may be aware of the SRS configuration information. If the SRS configuration information is the group-specific configuration information, this represents grouping of multiple UEs which may be a set of UEs in the same serving cell or a set of UEs in different cells. A method of grouping UEs may include grouping based on the locations of UEs or a channel between UEs.

Proposal 16-1

Predefined signaling for transmitting the group-specific or cell-specific SRS configuration information determined for UE-to-UE measurement may be RRC signaling.

The eNB may transmit the group-specific or cell-specific SRS configuration information to the UE through RRC signaling. To inform the UE of the group-specific or cell-specific SRS configuration information, the group-specific or cell-specific SRS configuration information may include a UE ID, a group ID, or a cell ID.

Proposal 16-2

Predefined signaling for transmitting the group-specific or cell-specific SRS configuration information determined for UE-to-UE measurement may be performed through DCI.

The eNB may signal the group-specific or cell-specific SRS configuration information to the UE through the DCI. This means that which SRS should be transmitted to which UE is explicitly signaled. The eNB may transmit the group-specific or cell-specific SRS configuration information to the UE through RRC signaling. To inform the UE of the group-specific or cell-specific SRS configuration information, the group-specific or cell-specific SRS configuration information may include a UE ID, a group ID, or a cell ID.

Proposal 16-3

Predefined signaling for transmitting group-specific or cell-specific SRS configuration information determined for UE-to-UE measurement may be performed through a group-common PDCCH.

The eNB may broadcast the group-specific or cell-specific SRS configuration information through the group-common PDCCH. This means that the eNB explicitly informs UEs of any group of a resource corresponding to the IMR. To inform the UE of the group-specific or cell-specific SRS configuration information, the group-specific or cell-specific SRS configuration information may include a UE ID, a group ID, or a cell ID.

Proposal 17

For UE-to-UE cross-link interference measurement, cell-specific, group-specific, or UE-specific SRS configuration information, ID information (a cell ID, a group ID, and/or a UE ID), and/or numerology information may be exchanged between TRPs (e.g., using an X2 interface).

In the above proposal, the SRS configuration information may include, for example, a cell ID, a group ID, and/or a UE ID as well as a sequence root number, information about the sub-band location and frequency offset of a sub-band SRS, and/or information about the symbol location and timing offset of an SRS so as to distinguish between SRSs transmitted by the aggressor UE. The numerology information in a corresponding cell may also be exchanged. Only when numerology used in a neighbor cell is known, an accurate location of an IMR used in the neighbor cell may be used with information about the location or offset of a slot or a subframe in which the IMR is located, information about the location or offset of a symbol in which the IMR is located, and/or information about the location or offset of a frequency in which the IMR is located.

Proposal 18

The UE may periodically and/or aperiodically report information about UE-to-UE cross-link interference measured using an SRS to a serving cell.

The UE may perform UE-to-UE cross-link interference measurement using a determined or indicated SRS and pair a measured cross-link interference value and an SRS index, thereby reporting the measured value and the SRS index to the eNB.

Proposal 18-1 (Periodic)

The UE may report the measured RSRI value to the eNB only when the measured value is greater than a preset threshold or may always periodically report the measured value to the eNB regardless of whether measured value is greater than the preset threshold.

The UE may periodically report the measured cross-link interference value (e.g. RSRP value) to the eNB at given periods through a PUCCH or a PUSCH. However, in order to reduce power consumption of the UE, only when the measured value is greater than the preset threshold, the UE may report the measured value to the eNB at a corresponding period among the given periods and, otherwise, the UE may not perform reporting to the eNB. In this case, the UE may determine whether to transmit the measured value to the eNB. The UE may report a difference between a previously measured/reported value and the measured value to the eNB or report the measured value to the eNB.

Proposal 18-2 (Aperiodic)

The UE performs reporting to the eNB only when the measured cross-link interference RSRP value is greater than the preset threshold or when there is a preset threshold error as compared with a previously measured/reported value.

The UE may report the measured value to the eNB by request based on event-trigger, without periodically reporting the measured value to the eNB through the PUCCH or the PUSCH at given periods. That is, only when the measured value is greater than the preset threshold, the UE may report the measured value to the eNB at a corresponding period among the given periods or when there is a preset threshold error as compared with a previously measured/reported value, the UE may report the measured value to the eNB by request.

Proposal 18-3

Upon performing transmission to the eNB, the UE may report information about M higher measurement values (or the highest or average result) together with linked SRS configuration indexes.

Although the UE may periodically or aperiodically report all cross-link interference measurement results to the eNB, the UE may report a specific subset. In this case, the specific subset may include the information about M measurement results and may be reported together with the SRS configuration indexes so that the eNB may be implicitly aware of in which neighbor cell a UE generates interference.

Proposal 19

When the UE performs periodic UE-to-UE cross-link interference measurement using an IMR or an SRS, the eNB may inform a UE in a specific satiation whether periodic measurement is enabled or disabled.

When UE-to-UE cross-link interference is periodically measured, this measurement may not cause any gain in a specific situation. Rather, if the UE reports an incorrect measurement result to the eNB, an incorrect resource may be allocated so that performance may be lowered. Therefore, a UE satisfying a specific condition (e.g., a UE moving fast, a UE located at the center of a cell, or a UE that should reduce power consumption) may be helpful if periodic UE-to-UE cross-link interference measurement is enabled or disabled. Methods of enabling or disabling periodic UE-to-UE cross-link interference measurement are proposed below.

Proposal 19-1 (Implicit Method)

When the UE determines that the above specific condition is satisfied, the UE may not perform cross-link interference measurement and may not perform reporting to the eNB.

Grounds for determining whether the UE satisfies a specific condition are needed. As an example, speed information may be obtained by means of a GPS sensor of the UE. If a signal received from the eNB has channel quality (e.g., determined by an RSRP, CSI, or CQI) above a specific threshold, the UE may enter a low-power mode. If the above method is used, the eNB is not aware of whether the UE has made such a decision. However, if a cross-link interference measurement report is not successively received or a plurality of reports is not received, the eNB may be aware of whether the UE has made such a decision.

Proposal 19-2 (Explicit Method)

If the UE or eNB satisfies the above specific condition, the eNB may inform the UE of a signal capable of disabling periodic UE-to-UE cross-link interference measurement through predefined signaling.

Grounds that the eNB should determine whether the UE satisfies a specific condition are needed. As an example, if a handover request is reported as many times as a specific number of times within a specific time or if reporting indicating that a signal has channel quality (e.g., determined by the RSRP, CSI, or CQI) above a specific threshold from the UE, the eNB may command the UE not to perform cross-link interference measurement. To this end, the eNB may signal information indicating that IMR is invalid as in Proposal 11-2 to the UE. Furthermore, the eNB may inform the UE of information indicating that the IMR is invalid only during a specific time among time periods together with a specific time value.

The above-described embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent upon each other may of course be combined to provide an embodiment or new claims can be added through amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of reporting measurement information and a UE therefor have industrial availability in various wireless communication systems such as a 3GPP LTE/LTE-A system and a 5G communication system.

What is claimed is:

1. A method of receiving and transmitting a signal by a base station (BS), the method comprising:
    transmitting, to a user equipment (UE), interference measurement resource (IMR) configuration information or sounding reference signal (SRS) configuration information, for cross-link interference measurement; and
    receiving a report including a cross-link interference value related to the IMR configuration information or the SRS configuration information,
    wherein the report includes i) information on a predetermined number of higher measurement values and ii) IMR indexes corresponding to the predetermined number of higher measurement values or SRS resource indexes corresponding to the predetermined number of higher measurement values.

2. The method of claim 1,
    wherein the IMR configuration information includes information regarding a location of an IMR, and
    wherein the cross-link interference measurement is performed at the location of the IMR.

3. The method of claim 1,
    wherein the IMR configuration information or the SRS configuration information is UE-specifically configured.

4. The method of claim 1,
    wherein the IMR configuration information or the SRS configuration information is transmitted through radio resource control (RRC) signaling, downlink control information (DCI), or a group-common physical downlink control channel (PDCCH).

5. The method of claim 1,
    wherein the cross-link interference measurement is performed based on satisfying a predetermined condition.

6. The method of claim 1, further comprising
    transmitting control information regarding whether the IMR configuration information is valid and whether the cross-link interference measurement needs to be performed,
    wherein, based on the control information indicating that the IMR configuration information is valid and the cross-link interference measurement needs to be performed, the cross-link interference measurement is performed.

7. The method of claim 5,
    wherein the predetermined condition is satisfied based on a transmission direction of the BS being downlink (DL) and a transmission direction of a neighbor BS being uplink (UL).

8. The method of claim 1,
    wherein the report is aperiodically received based on a difference between the measured cross-link interference value and a previously reported measured value being greater than a threshold difference.

9. The method of claim 1,
    wherein the SRS configuration information includes information regarding a location of a transmission resource of an SRS and a sequence of the SRS, and
    wherein the cross-link interference measurement is performed based on the SRS.

10. A base station (BS) for receiving and transmitting a signal, the BS comprising:
    at least one transceiver;
    at least one processor; and
    at least one memory storing instructions that cause the at least one processor to perform operations comprising:
    transmitting, to a user equipment (UE), interference measurement resource (IMR) configuration information or sounding reference signal (SRS) configuration information, for cross-link interference measurement; and
    receive a report including a cross-link interference value related to the IMR configuration information or the SRS configuration information,
    wherein the report includes i) information on a predetermined number of higher measurement values and ii) IMR indexes corresponding to the predetermined number of higher measurement values or SRS resource indexes corresponding to the predetermined number of higher measurement values.

11. The BS of claim 10,
    wherein the IMR configuration information includes information regarding a location of an IMR, and
    wherein the cross-link interference measurement is performed at the location of the IMR.

12. The BS of claim 10,
    wherein the SRS configuration information includes information regarding a location of a transmission resource of an SRS and a sequence of the SRS, and
    wherein the cross-link interference measurement is performed based on the SRS.

13. The BS of claim 10,
    wherein the IMR configuration information or the SRS configuration information is UE-specifically configured.

14. An apparatus comprising:
at least one processor; and
at least one memory storing instructions that cause the at least one processor to perform operations comprising:
receiving interference measurement resource (IMR) configuration information or sounding reference signal (SRS) configuration information, for cross-link interference measurement, from a base station (BS);
performing the cross-link interference measurement based on the IMR configuration information or the SRS configuration information; and
transmitting a report including a measured cross-link interference value to the BS,
wherein the report includes i) information on a predetermined number of higher measurement values and ii) IMR indexes corresponding to the predetermined number of higher measurement values or SRS resource indexes corresponding to the predetermined number of higher measurement.

15. The apparatus of claim 14,
wherein the IMR configuration information includes information regarding a location of an IMR, and
wherein the cross-link interference measurement is performed at the location of the IMR.

16. The apparatus of claim 14,
wherein the IMR configuration information or the SRS configuration information is UE-specifically configured.

17. The apparatus of claim 14,
wherein the cross-link interference measurement is performed based on satisfying a predetermined condition.

18. The apparatus of claim 17,
wherein the predetermined condition is satisfied based on a transmission direction of the BS being downlink (DL) and a transmission direction of a neighbor BS being uplink (UL).

19. The apparatus of claim 14,
wherein the report is aperiodically transmitted based on a difference between the measured cross-link interference value and a previously reported measured value being greater than a threshold difference.

20. The apparatus of claim 14,
wherein the SRS configuration information includes information regarding a location of a transmission resource of an SRS and a sequence of the SRS, and
wherein the cross-link interference measurement is performed based on the SRS.

* * * * *